US007966298B2

(12) United States Patent
Bruso et al.

(10) Patent No.: US 7,966,298 B2
(45) Date of Patent: Jun. 21, 2011

(54) RECORD-LEVEL LOCKING AND PAGE-LEVEL RECOVERY IN A DATABASE MANAGEMENT SYSTEM

(75) Inventors: Kelsey L. Bruso, Minneapolis, MN (US); James M. Plasek, Shoreview, MN (US)

(73) Assignee: Unisys Corporation, Blue Bell, PA (US)

(*) Notice: Subject to any disclaimer, the term of this patent is extended or adjusted under 35 U.S.C. 154(b) by 533 days.

(21) Appl. No.: 12/150,646

(22) Filed: Apr. 30, 2008

(65) Prior Publication Data
US 2009/0276430 A1 Nov. 5, 2009

(51) Int. Cl.
G06F 7/00 (2006.01)
G06F 17/00 (2006.01)

(52) U.S. Cl. .................... 707/675; 707/703; 707/704

(58) Field of Classification Search .......... 707/674–686, 707/704, 687, 609, 999.2, 999.201, 999.202, 707/999.008, 999.001, 703, 999.003
See application file for complete search history.

(56) References Cited

U.S. PATENT DOCUMENTS

| 5,287,501 | A | * | 2/1994 | Lomet | 707/648 |
|---|---|---|---|---|---|
| 5,465,328 | A | * | 11/1995 | Dievendorff et al. | 714/15 |
| 5,485,608 | A | * | 1/1996 | Lomet et al. | 1/1 |
| 5,561,795 | A | * | 10/1996 | Sarkar | 1/1 |
| 5,596,754 | A | * | 1/1997 | Lomet | 710/200 |
| 5,884,328 | A | * | 3/1999 | Mosher, Jr. | 1/1 |
| 6,879,981 | B2 | * | 4/2005 | Rothschild et al. | 1/1 |
| 7,809,759 | B1 | * | 10/2010 | Bruso et al. | 707/797 |
| 2002/0165724 | A1 | * | 11/2002 | Blankesteijn | 705/1 |
| 2003/0105732 | A1 | * | 6/2003 | Kagalwala et al. | 707/1 |
| 2005/0102250 | A1 | * | 5/2005 | Carr et al. | 707/1 |

* cited by examiner

*Primary Examiner* — Brent Stace
(74) *Attorney, Agent, or Firm* — Robert P. Marley

(57) ABSTRACT

Disclosure of approaches for processing database transactions against a database. In one approach, a first transaction is received that specifies an operation for changing state of a first record stored in a first database page. In processing the operation, the state of the record is changed, and information is stored in a companion page. The information includes a transaction identifier, data describing the specified operation, a page identifier of the first page, a before look and an after look of the first record for an update operation, and an after look of the first record for an insert operation. In response to a commit of the first transaction, a process determines whether a second transaction, that specifies a change in state for a second stored in the first page, is in-process. In response to determining that the second transaction is in process, the companion page is stored in an audit trail. In response to determining that no such second transaction is in process, a transaction identifier of the first transaction and associated data of the first page are stored in the audit trail.

15 Claims, 17 Drawing Sheets

| trx id: 1<br>time: 1<br>type: database | trx id: 2<br>time: 1<br>type: database | trx id: 1<br>time: 4<br>type: database | trx id: 2<br>time: 5<br>type: database | trx id: 1<br>time: 21<br>type: COMMIT | trx id: 2<br>time: 24<br>type: COMMIT |
|---|---|---|---|---|---|
| database pg 10 | database pg 8 | database pg 11 | database pg 9 | | |

| trx id: 1<br>time: 1<br>type: companion | trx id: 2<br>time: 3<br>type: companion | trx id: 1<br>time: 4<br>type: database | trx id: 2<br>time: 5<br>type: database | trx id: 1<br>time: 21<br>type: COMMIT | trx id: 2<br>time: 24<br>type: COMMIT |
|---|---|---|---|---|---|
| UPDATE<br>companion pg 8<br>record 2<br><before look><br><after look> | UPDATE<br>companion pg 10<br>record 5<br><before look><br><after look> | database pg 11 | database pg 8 | | |

RECORD-LEVEL LOCKING AND PAGE-LEVEL RECOVERY IN A DATABASE MANAGEMENT SYSTEM

FIELD OF THE INVENTION

The present invention generally relates to concurrency and recovery in database management systems.

BACKGROUND

Many software applications involve multiple requesters seeking access to a shared resource. For example, an airline reservation system concurrently processes reservation requests on behalf of the travelers seeking to travel the routes serviced by the airline. Database management system (DBMS) software underlies the application software and controls access to the shared data resources in order to maintain database consistency. For other types of applications, underlying system software similarly controls access to data objects that are shared by multiple requesters.

System performance may be improved in multi-requester applications by supporting concurrent processing of multiple requests. The system protects against data inconsistency by allowing only one requester at a time to change the data of a particular object. This control may be implemented by way of lock control structures, timestamps, or semaphores, for example. The system also detects deadlock situations and suitably undoes any partially completed requests.

The data of a relational database is often viewed as one or more tables. Each row of the table may be viewed as a record that contains logically related data elements, which are defined by the columns. Within the database, the DBMS maintains the data in one or more files. Each of the files is divided into pages, and each page contains one or more records.

One of the hallmarks of DBMSs is the ability to ensure that updates persist across both hardware and software failures. This capability is typically enabled using a log or audit trail which contains information about each incremental update to the database as made by each transaction.

DBMSs generally take two approaches to create the incremental update information. In the first approach, the DBMS takes a snapshot of the updated page after it has been updated by the modifying transaction. The contents of the entire page are stored in a record in the audit trail. In the second approach, the DBMS stores a copy of the modifying operation (INSERT, UPDATE, or DELETE) in an audit record.

When a failure occurs, the database administrator uses a recovery utility to restore the database to a consistent state. With the first approach, the recovery utility reads the contents of pages from the audit trail and writes the page data to the database file in timestamp order. With the second approach, the recovery utility, in conjunction with the DBMS, replays the database modifications, in timestamp order. For discussion purposes, the first approach provides "page level" auditing and recovery, and the second approach provides "record level" auditing and recovery.

An advantage of page level recovery is that the recovery operation can be done very quickly without intervention by the DBMS. A disadvantage is that the DBMS must have exclusive access to the page at the time the page snapshot is written to the audit trail and must maintain the exclusive access until a COMMIT point of the transaction. This prevents other update transactions from accessing the page, thereby reducing concurrency. An advantage of record level recovery is that the DBMS requires exclusive access only to the specific record at the time the modifying operation is written to the audit trail and maintains the exclusive access, only to the record, until a COMMIT point. Thus, for record level auditing other transactions may access other records on the page. A disadvantage of record level recovery is that during a recovery operation, the DBMS must reapply each modification individually, which can be very time consuming.

A method and system that address these and other related issues are therefore desirable.

SUMMARY

The various embodiments of the invention provide methods and systems for processing database transactions against a database having a plurality of records stored on a plurality of database pages. In one embodiment, the method comprises receiving a first transaction that specifies an operation for changing state for a first of the plurality of records stored on a first of the plurality of database pages. The operation is one of an insert, update, and delete operation. The method includes changing the state of the first record according to the first transaction, and storing information in a companion page. The information stored in the companion page includes, a transaction identifier of the first transaction, data describing the specified operation, a page identifier of the first page, a before look and an after look of the first record for an update operation, and an after look of the first record for an insert operation. In response to a commit of the first transaction, the method determines whether a second transaction, that specifies a change in state for a second of the plurality of records and the second record being stored on the first page, is in-process. In response to determining that the second transaction is in process, the method stores the companion page in an audit trail. In response to determining that the second transaction is not in process, the method stores a transaction identifier of the first transaction and associated data of the first page in the audit trail.

An apparatus for processing database transactions is provided in another embodiment. The apparatus comprises means for processing a transaction that specifies an operation for changing state of a record stored to a database page. The operation is one of an insert, update, and delete operation, and the record is one of a plurality of records stored on one of a plurality of database pages. The transaction has a first level of control over access to the record and a second level of control over access to the database page. The apparatus includes means for committing the transaction, which further includes means for storing contents of the database page in a record in an audit trail in response to no other transaction having any level of control over access to the database page. The means for committing also includes means for storing a before look of the record and an after look of the record for an update database operation in a record in the audit trail in response to another transaction having a level of control over access to the database page, and means for storing a commit record for the transaction in an audit record in the audit trail.

In yet another embodiment, a data processing system is provided for processing database transactions. The system comprises a storage arrangement for storing a database and an audit trail and a processor coupled to the storage arrangement. The storage arrangement is configured with instructions for causing the processor to perform the operations including, processing a transaction that specifies an operation for changing state of a record stored to a page of the database. The operation is one of an insert, update, and delete operation, and the record is one of a plurality of records stored on one of a plurality of database pages. The transaction has a first level of control over access to the record and a second level of control over access to the database page. The operations further include committing the transaction, and the committing includes the operations of storing contents of the database page in a record in an audit trail in response to no other transaction having any level of control over access to the database page. The committing further includes storing a before look of the record and an after look of the record for an update database operation in a record in the audit trail in response to another transaction having a level of control over access to the database page, and storing a commit record for the transaction in an audit record in the audit trail.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which:

FIG. 11D shows another example of the audit trail with companion page entries;

FIG. 11E shows yet another example of the audit trail with companion page entries.

DETAILED DESCRIPTION

Figure 1:
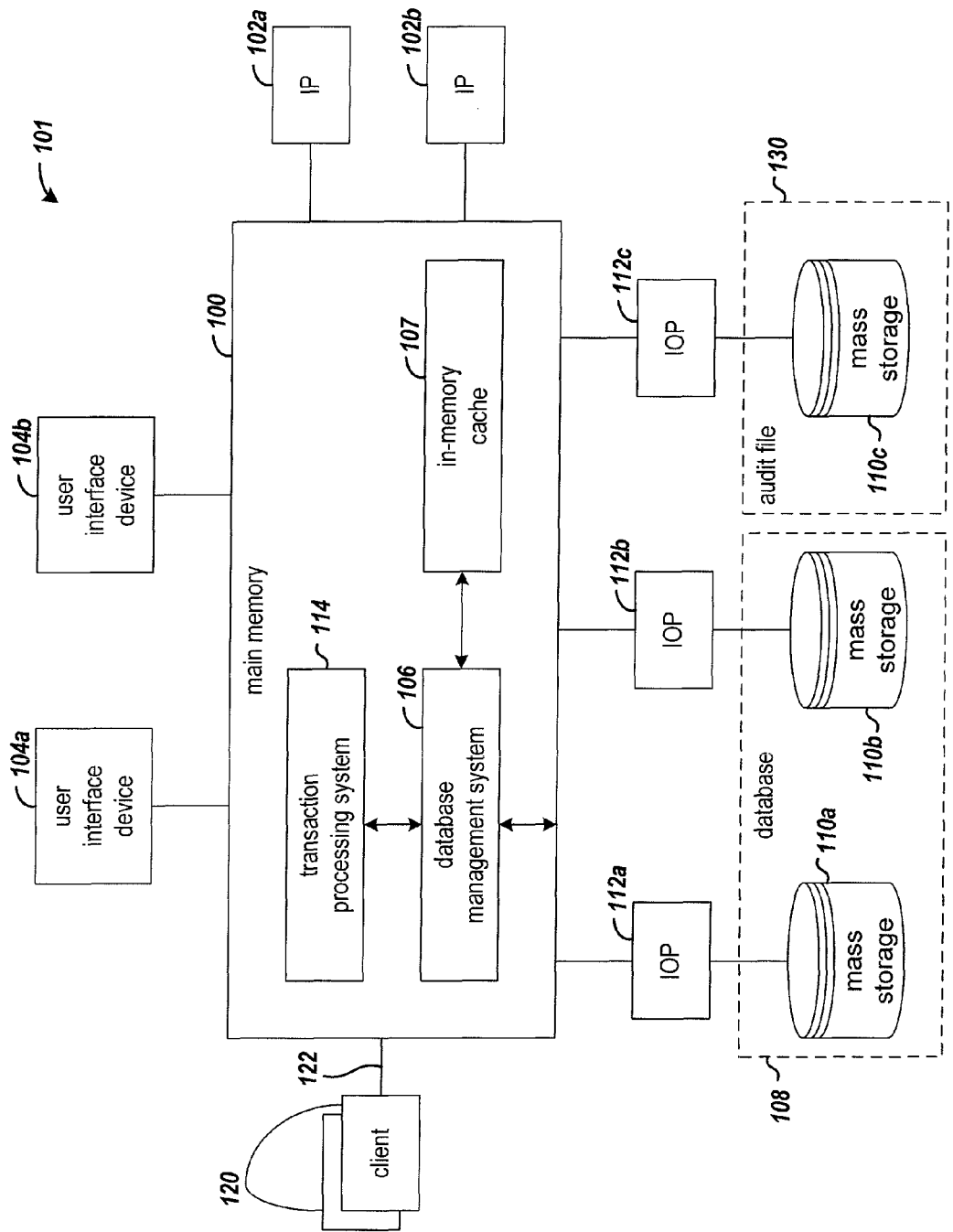
FIG. 1 is a block diagram of an example data processing system in which various embodiments of the invention may be implemented.

The various embodiments of the invention provide approaches for processing database transactions against a database, along with a hybrid recovery approach for database recovery. The embodiments combine the concurrency advantages of record-level locking and recovery with the recovery speed of page-level locking and recovery. The embodiments of the invention are well-suited for managing the primary key B-Tree as well as a secondary index B-Tree or to any other B-Tree.

According to one approach for processing database transactions against a database, a received transaction specifies an operation for changing the state for a record of the database. The operation specified by the transaction is one of an insert, update, or a delete operation. The DBMS changes the state of the specified record according to the transaction. The DBMS also stores in a companion page, a transaction identifier of the first transaction, data describing the specified operation, a page identifier of the first page, a before look and an after look of the first record for an update operation, and an after look of the first record for an insert operation. When the transaction is to be committed, the DBMS determines whether the second transaction, that specifies a change in state for another record which is stored on the same page as the first record, is in-process. If there is another such transaction in process, the DBMS stores the companion page in an audit trail. At some time in the future when one other such transaction is the only transaction accessing the page and that other transaction commits, the DBMS writes the database page to the audit trail along with the transaction identifier.

From the foregoing approach for auditing transactions, when database recovery is required a hybrid approach, may be used to combine the strengths of page level recovery and record level recovery. The hybrid approach uses a record level locking strategy to maximize page concurrency during transaction processing and uses a specialized page level recovery strategy. At recovery time, for a given page the audit trail will show one of the three following situations: 1) the database page appears (the updating transaction was the only transaction accessing the page): 2) companion pages appear followed by a copy of the database page (one or more updating transactions each recorded its incremental update in a companion page and the final updater was the only transaction accessing the page so the DBMS wrote the database page to the audit trail instead of the companion page); or 3) companion pages appear followed by the end of the audit trail (there was no transaction that was alone in updating the page and that committed an update to that page before recovery was required). Any serialization technique may be used to serialize the companion pages. In an example embodiment, timestamps are used.

The processing performed during recovery for a particular page depends on the state of the audit trail. If the database page appears on the audit trail, the database page from the audit trail is written to the database file since it is the current version of the page. If there are one or more companion pages followed by a copy of the database page, the companion pages are staged until the database page is discovered, and the database page from the audit trail is written to the database file and the staged companion pages are discarded. If there are one or more companion pages for which there is not a subsequent database page, the incremental record updates are applied to the database file in timestamp order.

Figure 2:
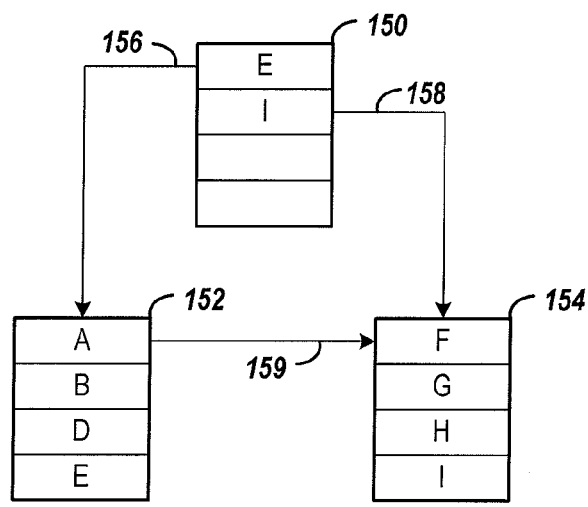
FIG. 2 is an example of a B+tree structure that may be used to represent a database table.
Figure 3:
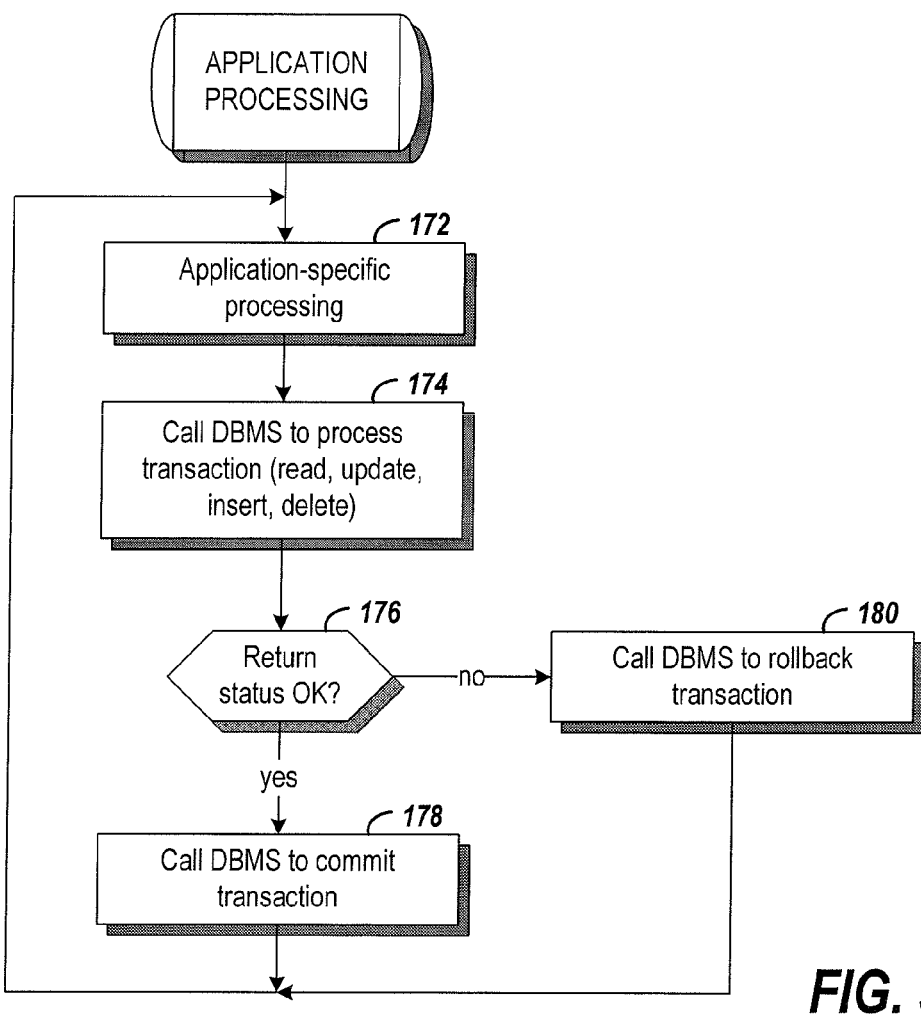
FIG. 3 is a flowchart that shows example application program processing for a transaction.

FIGS. 1, 2, and 3 and the following discussion are provided for purposes of providing context for the description of the different embodiments and features of the invention as shown and described in the remaining figures and discussion.

FIG. 1 is a block diagram of an example data processing system 101 in, which various embodiments of the invention may be implemented. The example system illustrates a large-scale data processing system with multiple instruction processors (IPs) 102a and 102b. However, those skilled in the art will recognize that other types of data processing systems, such as a personal computer or a workstation may be used. The system includes a main memory 100 that is coupled to one or more IPs 102a and 102b. The memory may also be directly or indirectly coupled to one or more user interface devices 104a and 104b, which may include dumb terminals, personal computers, workstations, sound or touch activated devices, cursor control devices such as mice, printers, or any other known device used to provide data to, or receive data from, the data processing system.

A DBMS 106 is resident in main memory 100 and executes on IPs 102a and, 102b to manage and provide access to a database 108 (shown dashed). The database may be stored on an arrangement of one or more mass storage devices 110a and 110b. Mass storage devices may be hard disks or any other suitable type of non-volatile or semi non-volatile devices that provide persistent storage of data. These mass storage devices may be configured as a Redundant Array of Independent Disks (RAID). As known in the art, this configuration provides a mechanism for redundantly storing multiple copies of the same data on multiple hard disks to improve efficient retrieval of the data, and to increase fault tolerance. Battery back up may be provided, if desired. The transfer of data between mass storage devices and DBMS is performed by Input/Output Processors (IOPs) 112a, 112b, and 112c.

A transaction processing system 114 may be coupled to DBMS 106. The transaction processing system receives queries for data stored within database 108 from one or more users. Transaction processing system 114 formats the queries and then passes them to DBMS 106 for processing. DBMS 106 processes the queries by retrieving data records from, and storing data records to, the database 108.

The system of FIG. 1 may further support a client/server environment. In this case, one or more clients 120 are coupled to data processing system 101 via a network 122, which may be the Internet, an intranet, a local area network (LAN), wide area network (WAN), or any other type of network known in the art. Some, or all, of the one or more clients 120 may be located remotely from the data processing system.

For purposes of database recovery, the DBMS may log data to the audit file 130 (or "audit trail"). With each processed transaction, the DBMS may write to mass storage 110c data that describes updates to one or more pages of data of the database. If recovery of the database is required, the records in the audit file may be used to reconstruct the database.

FIG. 2 is an example of a B+tree' structure that may be used to represent a database table. In the illustrated B+tree structure only the leaf nodes contain data records and the leaf nodes are sequentially linked. In another embodiment, a B–tree may be employed wherein data records are stored in both the non-leaf and the leaf nodes.

tree of FIG. 2 includes a non-leaf node 150 and two leaf nodes 152 and 154, which are children of non-leaf node 150. Generally, non-leaf nodes store index values and pointers identifying the child nodes. For example, non-leaf node 150 stores a pointer 156 and an index value "E" that identifies leaf node 152. Similarly, the non-leaf node stores a pointer 158 and an index value "I" identifying leaf node 154. Pointers 156 and 158 may each be an address, an offset, or any other type of indicia that uniquely identifies, and allows for efficient traversal to, a selected one of the leaf nodes. The index values specify the key of the last record stored in the referenced leaf nodes. For example, index "E" indicates that any records having index values between the first index value, "A", and "E" will be located on leaf node 152, and any records having an index value after "E" but before, and including, "I" will be stored on leaf node 154. In another embodiment, non-leaf node 150 could store the index value for the first, rather than the last, record within the respective leaf node.

As discussed above, because the illustrated tree is a B+tree, the non-leaf nodes do not store the actual data records. The data records are only stored on the leaf nodes. For example, leaf node 152 stores records A-E. Similarly, leaf node 154 stores records F-I. These records are stored within the leaf in a sort order dictated by the index values "A", "B", "C", and etc. These index values provide searchable data that are used to access a desired record. One or more index values may be used to arrange the records within a sort order. A primary and/or secondary key value may be used as an index value. As is known in the art, primary and secondary keys are searchable values identifying a record. In some embodiments, the primary key is used to uniquely identify a record. In other embodiments wherein each primary key value is not unique, some other mechanism such as a row identifier is used to uniquely identify each record.

As the database grows, the B+tree will also grow to include additional data pages and additional index pages. Thus, an index page may be referenced by a parent index page in the B+tree and may itself contain references to child index pages in the B+tree.

In the tree of FIG. 2, leaf node 152 may store a pointer 159 to leaf node 154. This pointer may be an address or some other indicia that allows a sequential traversal of database records without traversing the index nodes of the tree. If desired, reverse pointers may be provided. For example, a pointer may be stored in leaf node 154 pointing to leaf node 152.

The index nodes and leaf nodes also include page control information (not shown). The page control information may include information such as the number of records currently on a page, the amount of page space currently in use, and in the case of a leaf node, a pointer to the next leaf node in the database. Another embodiment may include a pointer to the prior leaf node and/or a pointer to the index page which points to the current page.

When non-leaf and leaf nodes are created, each of these nodes is allocated a predetermined amount of storage space by DBMS 106. The predetermined amount of storage space allocated to a node corresponds to a page of a file. The page size is usually based on the architectural characteristics of the underlying file system. For example, if the file system manages pages of 4096 bytes, the selected page size may be some multiple of 4096. A database administrator may select the size of the page, for instance. In one embodiment, the leaf nodes are the same size as the non-leaf nodes. In an alternative embodiment, the leaf nodes may be larger than the non-leaf nodes, or vice versa. In any event, DBMS 106 is aware of the size of the leaf and non-leaf nodes.

In an example implementation, a page is the unit of I/O for the DBMS. That is, to transfer data between a disk or other persistent store and memory, the DBMS reads or writes a page. Each page contains zero or more records. A page containing zero records is said to be an "empty page". Each record on the page may be a fixed or variable length, depending on the choices made by the implementers of the DBMS. Each page contains control information describing the contents of the page, such as the number of records on the page and the available space on the page. This control information can have different contents and different placement depend ing on the choices made by the implementers of the DBMS.

For purposes of illustration, the description assumes that each page contains a header, control structure, and one or more data records. These assumptions are not meant to limit the applicability of the invention. Other embodiments may have different arrangements and contents for the page control information and record data.

The header is at the beginning of the page. The header contains the following items of data: the page number of the page, the page size in bytes, the number of records on the page, the number of bytes available in unused space, the number of bytes used by active records, and the number of bytes used by deleted records.

The control structure in this description is a slot table. Those skilled in the art will recognize suitable alternatives, such as bit maps. The slot table is at the end of the page. The slot table contains one entry for each record on the page. Each entry contains the byte offset from the beginning of the page to the beginning of the record and the length of the record, in bytes. The order of the entries in the slot table reflects the sort order of the key values for the records stored on the page.

The one or more records fill the space between the page header and the slot table. Each record may be variable in length, depending on the amount of data stored in the record. The order of the records may or may not match the sort order of the key values of the records. In order to determine the sort order of the records, one must use the entries in the slot table. Each record contains a delete flag. This flag is set when the record has been deleted but its space has not been recaptured.

FIG. 3 is a flowchart that shows example application program processing for a transaction. At step 172, the program performs application-specific processing such as obtaining user input or manipulating or outputting data, for example.

At step 174, the application program calls the DBMS to process a transaction. For purposes of illustration, the possible transaction operations include read, update, insert or delete. Other implementations may have additional or logical operations with different names. In processing these transactions, the DBMS may perform additional operations that modify pages of the database. For example, the DBMS may recapture space on the page by compressing out deleted records, split a page, into two or more pages, or merge two pages together into one page.

The following paragraphs provide a background discussion of an example locking system, a page caching approach, and handling of index pages. A brief explanation of page level locking and recovery and record level locking and recovery is also provided for background.

Because multiple users may read from or write to the database concurrently, DBMSs provide a mechanism such as a locking system to serialize the accesses and updates so the multiple users do not conflict with each other while making updates. For the purposes of illustration, this description assumes that the DBMS provides the following types of locks on the page level and record level:

RP—Read lock on the page. Multiple users may have RP locks simultaneously. These users may also acquire record level locks for records on the page.

UP—Update lock on the page. Multiple users may have UP locks simultaneously. These users may also acquire record level locks for records on the page.

XUP—Exclusive update lock on the page. Only one user may have an XUP lock on the page. An XUP lock prevents all other locks, both page level locks and record level locks, from being granted on the same page.

RR—Read lock on a record. Multiple users may have RR locks simultaneously on the same record.

XRR—Exclusive read lock on a record. Only one user may have an XRR lock on a record.

PUR—Protected update lock on a record. Only one user may have a PUR lock on a record.

XUR—Exclusive update lock on a record. Only one user may have an XUR lock on a record.

The description assumes that an XUP lock may only be released as part of COMMIT or ROLLBACK processing. Any other lock may be acquired and released as the processing requires, as required by the well-known two-phase locking protocol.

Table 1 below summarizes an example locking protocol. A "Y" in a table cell indicates the lock is granted. An "N" indicates the lock is not granted. The DBMS may put the requesting transaction on a queue until the lock is available or may return control to the transaction along with an error status. Note that this table describes lock requests from different users, not a lock upgrade request from the same user.

TABLE 1

|  |  | lock request from 2$^{nd}$ user for same page | | | lock request from 2$^{nd}$ user for same record or same page | | | | lock request from 2$^{nd}$ user for different record on same page | | | |
|---|---|---|---|---|---|---|---|---|---|---|---|---|
|  |  | RP | UP | XUP | RR | XRR | PUR | XUR | RR | XRR | PUR | XUR |
| first user lock request | RP  | Y | Y | N | Y | Y | Y | Y | Y | Y | Y | Y |
|  | UP  | Y | Y | N | Y | Y | Y | Y | Y | Y | Y | Y |
|  | XUP | N | N | N | N | N | N | N | N | N | N | N |
|  | RR  | Y | Y | N | Y | Y | Y | Y | Y | Y | Y | Y |
|  | XRR | Y | Y | N | N | N | N | N | Y | Y | Y | Y |
|  | PUR | Y | Y | N | Y | Y | N | N | Y | Y | Y | Y |
|  | XUR | N | N | N | N | N | N | N | Y | Y | Y | Y |

Depending on the status returned from the DBMS (decision step 176), the application will either commit the transaction at step 178 (if the returned status code is OK) or call the DBMS to rollback the transaction at step 180 (if the status code is not OK). The committing of the transaction makes the database modifications permanent, and a rollback undoes the effects of the modifications.

Note that a page split or recapture operation may only be performed after a user has obtained an XUP lock on the target page. A page merge operation may only be performed after a user has obtained an XUP lock on both pages to be merged.

Table 2 describes in algorithmic form, assumed behaviors from the lock manager for second or subsequent lock requests on the same object by the same user:

TABLE 2

If a second lock request has the same lock strength or a weaker lock strength, the lock manager keeps the original lock and simply returns a status of OK.
If a second lock request has a stronger lock strength, the lock manager tries to upgrade the lock strength and:
  if the lock can be granted, it grants the stronger lock, frees the weaker lock, and returns a status of OK,
  if the lock cannot be granted and the request is "no queue", it keeps the weaker lock and returns an error status,
  if the lock cannot be granted and the request is queue, queues the transaction,
  if the queue times out or the transaction is targeted due to deadlock detection, and returns an error status
  when the lock can be granted, it grants the stronger lock, frees the weaker lock, and returns a status of OK.

If the lock manager provided by the DBMS does not behave in this manner, those skilled in the art will recognize the suitable, corresponding adjustments for the locking protocol. According to embodiments of the invention, the goal of the locking protocol (that is, the order of the lock requests and the specific lock strengths requested on each lock request) is to maximize the concurrency of readers and updaters on the same database page. The protocol requests the weakest lock strength needed to preserve serialization while simultaneously maximizing concurrency. The protocol requests strong locks (PUR, XUR, XUP), which block other transactions from reading the record or page, only when necessary. Alternate embodiments may provide different or differently named locks. If so, those skilled in the art will recognize suitable, corresponding adjustments to the locking protocol described herein.

According to an example page caching mechanism employed by the DBMS, pages are read into memory from a database file for searching or updating by a transaction. At an appropriate time, for example, during commit processing, any page that has been updated by a transaction is written back (stored) to the database file. The cache manager invalidates a page when its contents have become obsolete, for example, due to a modification in a different part of a distributed cache or due to a rollback of updates made by a transaction. If a system failure occurs during processing of a transaction, all updates it made to a page in cache are lost unless a record of the updates has been made on the audit trail or log.

When the cache is full, the caching mechanism overwrites never-updated and invalidated pages with newly requested pages and uses other management and control mechanisms using known cache management techniques.

As explained above, B+trees contain two types of nodes: leaf nodes and non-leaf nodes. In a common B+tree convention, only leaf nodes contain data records. Non-leaf nodes contain only index records. In a common database convention for B+tree structures, each node is represented by a database page. In this description leaf nodes may be referred to as data pages, and non-leaf nodes may be referred to as index pages. The description focuses on locking, inserting, updating, and deleting records, and locking, splitting, and merging of data pages. The locking, inserting, updating, deleting, splitting, and merging of index pages may also be handled using the described embodiments of the present invention or using prior art techniques. The description also mentions locking and residual locks held on index pages. The locking and updating of index pages may cascade beyond the next-higher-level index page, which may be handled according to known techniques.

When page-level locking is employed, updates are synchronized per transaction. Thus, if a transaction updates a record on a page, that transaction must commit or rollback before another transaction is allowed to update any record on that page. Locking must support this synchronization. A locking protocol, using the lock types previously described, that supports this synchronization requires updaters to obtain an XUP lock on the page prior to updating any record on the page, and keep that XUP lock until the completion of commit or rollback processing. Page-level locking has the disadvantage that when multiple records are on the same page, a transaction updating a single record on the page blocks other transactions from reading or updating any record on the page. An advantage is that entire pages are always written to the log/audit trail so that recovery is simple and fast; the recovery tool simply writes whole, committed, pages to the database file and the last committed copy of the page is the result of recovery. As compared to record-level locking, using page-level locking for processing transactions permits the recovery tool to write pages rather than replaying individual records.

When record-level locking and recovery is used, a transaction must obtain an XUR lock on a record before updating that record. This blocks other transactions from updating that record. However, other transactions are allowed to update other records on the same page. Updated records are written to the log/audit trail. These records must be replayed during recovery, which is much more complicated and time consuming than replaying a page.

The hybrid approach used in the embodiments of the present invention combines the strengths of page level recovery and record level recovery. Record-level locking is used to maximize page concurrency, and a specialized page-level recovery strategy is used to speed the recovery process. According to the specialized page-level recovery strategy, a transaction makes updates to the "database page" and saves information describing the incremental updates to a "companion page." At commit time, if the updating transaction is the only transaction accessing the page, the DBMS writes a copy of the database page to the audit trail and discards the companion page. If other transactions are also accessing the page, the DBMS writes the companion page to the audit trail. At some time in the future, one of the other updating transactions will be the only transaction accessing the page, and when that transaction commits, the DBMS writes the database page to the audit trail.

To aid in the locking protocol, the embodiments described herein assume that the first data record is numbered record 1 and that there exists a "dummy" record numbered 0 which may be locked and unlocked as any other record. Alternative embodiments of the invention may use semaphores, test-and-set cells, or other mechanisms instead of using a dummy record. Using locking on a dummy record simplifies the explanation of the invention by using only one mechanism for all serialization.

The audit trail or log (e.g., audit file in FIG. 1, 130) provides a persistent record of modifications made to the database, as well as other information. For the purpose of this discussion the term "audit trail" is used. For database updates, the embodiments of the invention assume that each entry in the audit trail contains a copy of the database page, either before (before look) or after (after look) the page was updated, and a header. In some embodiments, the DBMS may keep both a before look and an after look or may compress the page contents or alter it in some other manner. This discussion assumes that the DBMS stores an exact copy of the database page onto the audit trail.

The audit trail header contains the following information: the file identifier (for example the file name) for the file associated with the page, a timestamp for when the page was modified, the transaction identifier for the transaction which performed the modification, an indicator whether the database page is a before look or after look, and an indicator whether the associated page is a database page or companion page. Optionally, a sequence number may be included to ensure serializability of the page updates if the timestamp is not a sufficient granularity to guarantee serializability.

Additionally, the audit trail contains entries related to the state transitions of the transaction. The DBMS records whether the transaction ended with a commit or rollback. If the transaction participated in two-phase commit protocol, a prepare entry precedes the commit or rollback. Some embodiments may encapsulate the state transition and database page and header entries within begin-transaction and end-transaction state transition entries, which is not required by embodiments of the present invention. The approaches described herein rely on the commit records appearing in the audit trail in timestamp order. If commit records are not in timestamp order, those skilled in the art will recognize the modifications needed to ensure that the recovery tool applies updates to the database in timestamp order.

Companion pages begin as data structures in transaction-local memory which record the modifications made by the transaction to the corresponding database page. The companion pages for one transaction cannot be seen or modified by another transaction. The DBMS can see and modify the companion pages belonging to all transactions. Each companion page contains the following information: 1) the page number of the corresponding database page; 2) an indicator for the operation being performed (insert, update, or delete; transactions that only read from the database do not cause companion pages to be created); 3) the column name (or other indicia), column data type, and column value for each key column; 4) if the operation is update, a copy of the record before modification; and 5) a copy of the final record after insert or update. Because each companion page is stored in transaction-local memory, the DBMS does not have to request any locks for it. A transaction may make multiple updates on the same page, for example it can delete two records from the page and insert three records onto the page. Each operation (insert, update, or delete) creates an entry on the companion page for each modified record. Specific examples of data from companion pages stored in an audit trail are shown in FIGS. 12A-B and FIGS. 14A-B.

FIGS. 4A-10B and the accompanying description show and describe example embodiments in which the DBMS processes INSERT, DELETE, UPDATE, RECAPTURE, SPLIT, and MERGE operations to update the database page and to create the companion page. The embodiments described herein assume that space is incrementally reclaimed after DELETE or UPDATE relocate operations using page merge. Specifically, there is no "garbage collection" or process which performs large-scale reclamation of free space in the data pages. In an embodiment which uses garbage collection or vacuum operations, appropriate changes must be made to the operations described below as well as corresponding alterations to the locking protocol.

Figure 4A:
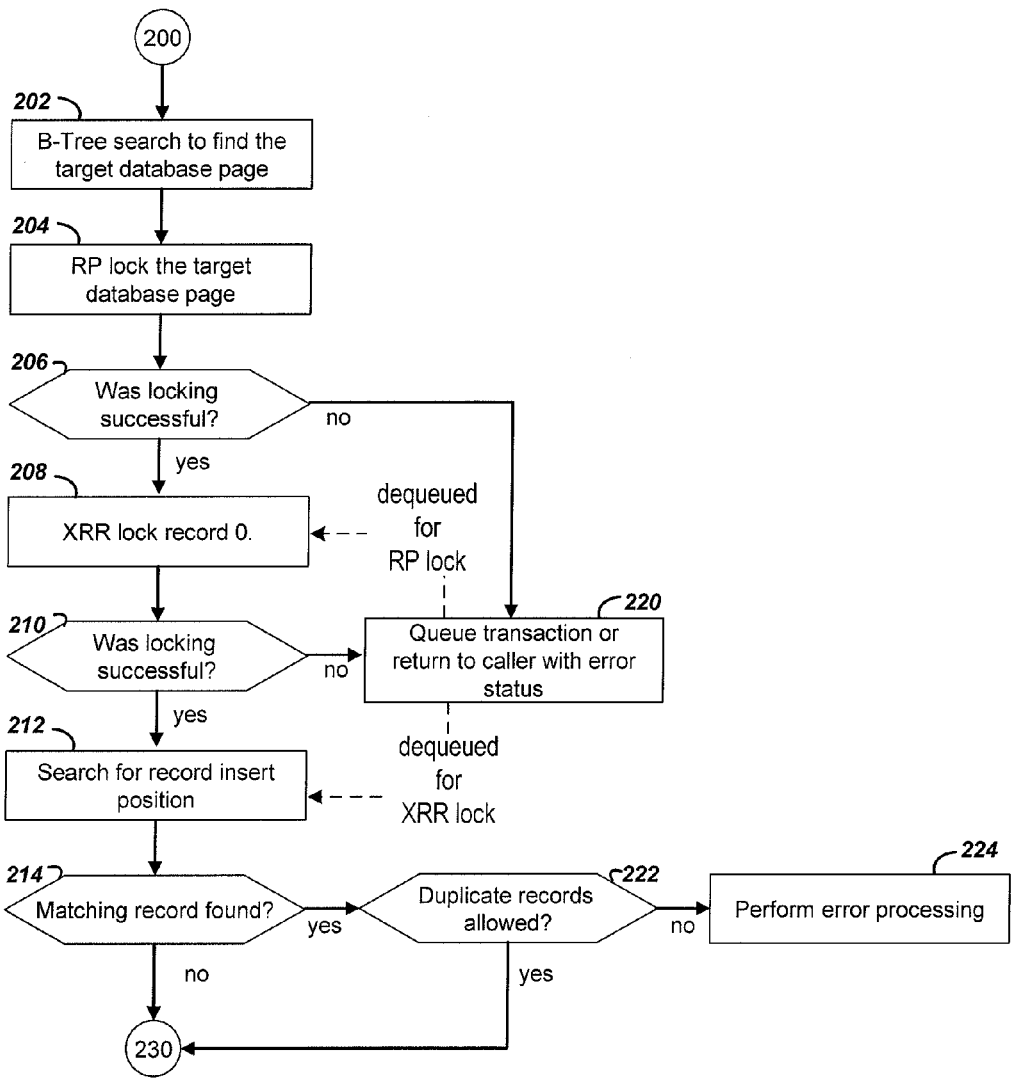
FIGS. 4A-4C contain flowcharts of an example process for inserting a record in a database in accordance with embodiments of the present invention.
Figure 4B:
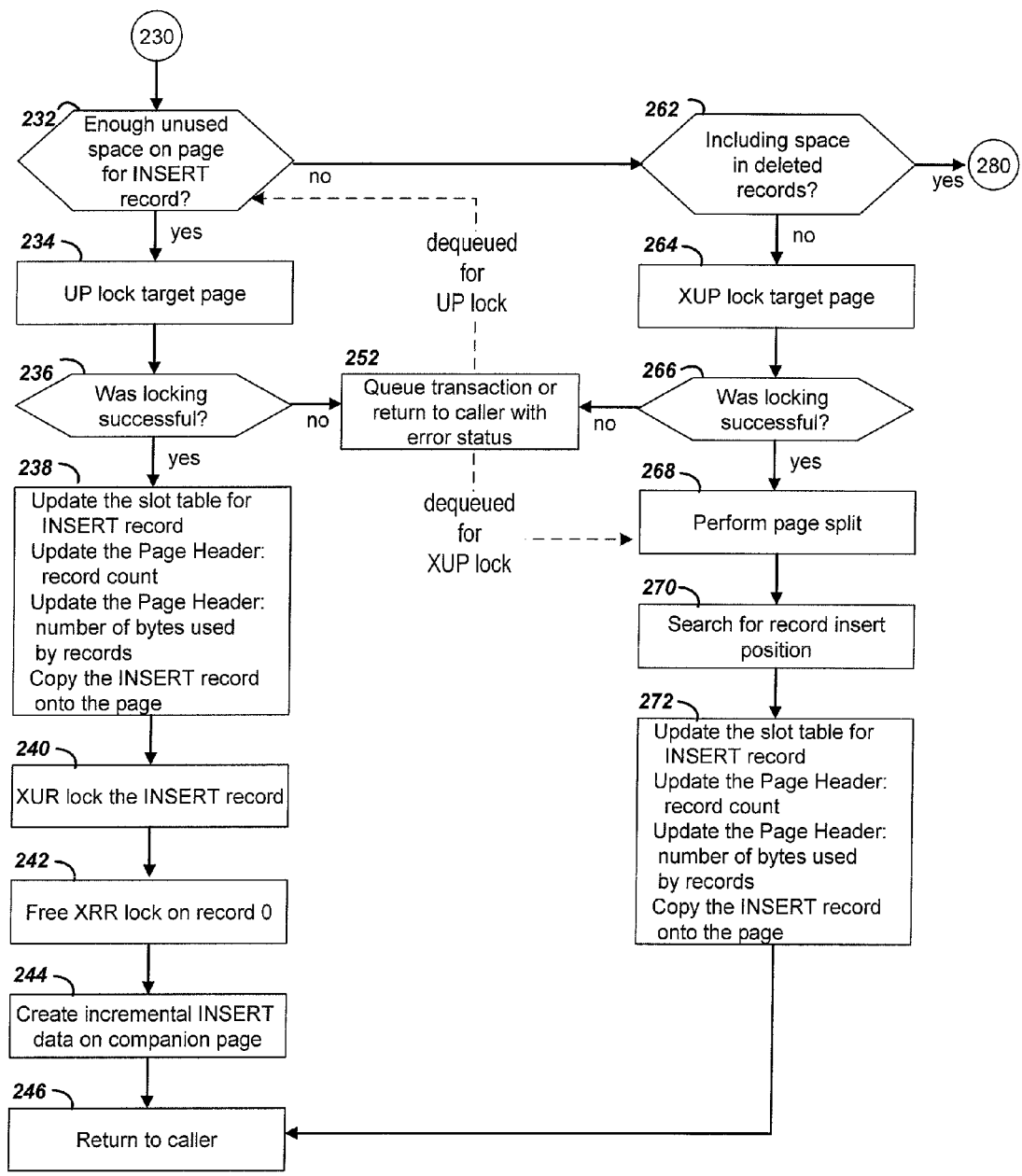
Figure 4C:
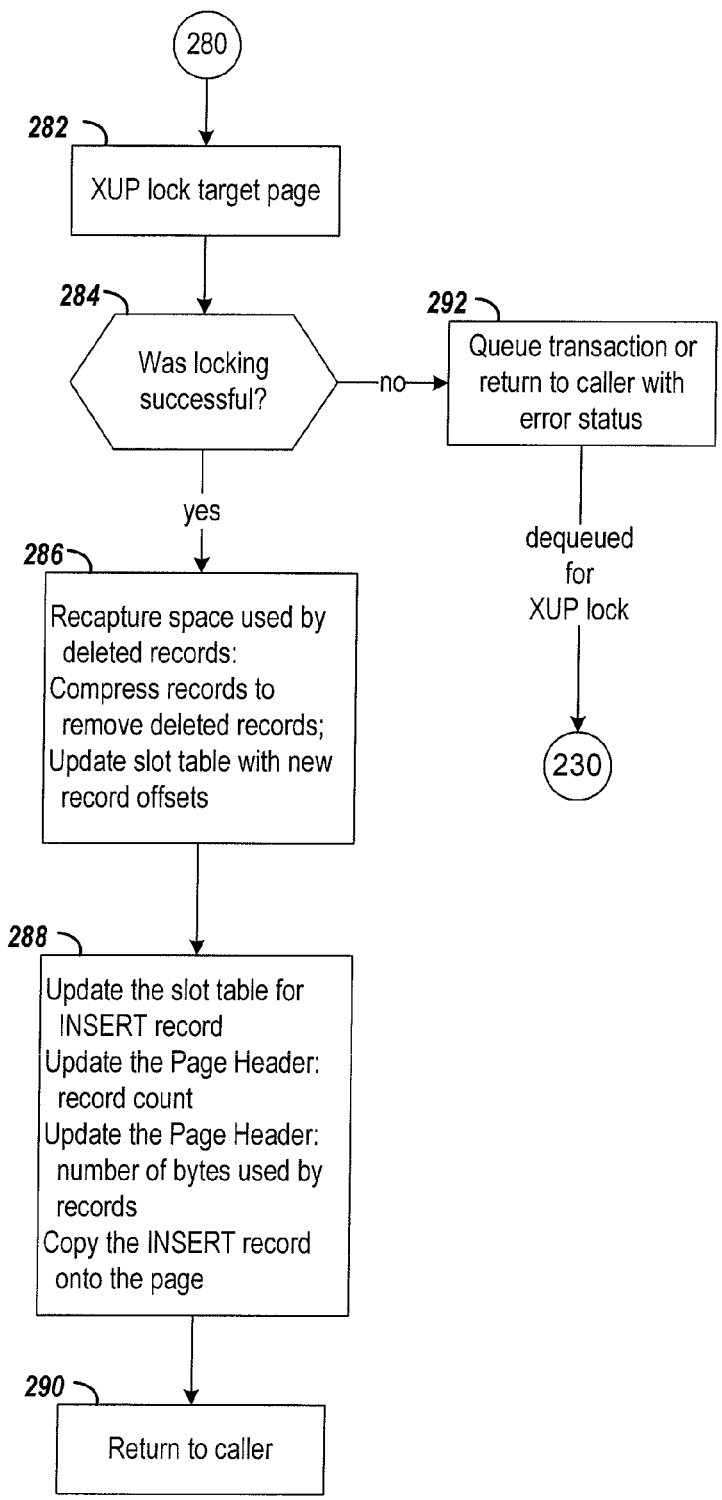

FIGS. 4A-4C contain flowcharts of an example process for inserting a record in a database in accordance with embodiments of the present invention. The INSERT operation is performed in the following two phases: 1) a find phase wherein the DBMS finds the appropriate page and the insert point for the record based on the sort order of the record's primary key; and 2) an add phase wherein the DBMS adds the record to the page. In the following discussion, the special cases for "empty table" and "empty page" are not considered because they do not present the serialization problems addressed by the present invention.

At step 202, the DBMS performs a B-Tree search to determine the page containing the insertion point for the new record. The B-Tree search finds the target page where the new record's primary key value should be inserted according to the key column's sort order. At step 204 the DBMS requests an RP lock on the target page. If the lock is granted, decision step 206 continues the process with step 208. Otherwise the process continues with step 220. If the lock request causes an error, step 220 performs rollback processing and returns control to the caller with an error status. If there was no error, step 220 puts the transaction on a queue. When the lock can be granted, the transaction is removed from the queue and the process continues with step 208.

At step 208, the DBMS requests an XRR lock on record 0. This prevents other transactions from reading or updating any records on the page while this transaction searches for the insertion point. If the lock is granted 210, the process continues with step 212; otherwise the process continues with step 220 where the DBMS performs rollback processing and returns control to the caller with an error status. If the locking was not successful and without error, the transaction is put on a queue at step 220. When the lock can be granted, the transaction is removed from the queue and the process continues with step 212.

At step 212, the DBMS performs the search for the record insertion point as described in Table 3.

TABLE 3

WHILE insertion point NOT found and NOT end-of-page DO
   search for the record position - do not lock individual records so that the
     processing may read other transactions' uncommitted INSERTs
     and UPDATEs
ENDWHILE.

The insertion point will be at the beginning of the series of records on the page, in the middle of the series of records, or at the end of the series of records. The processing at step 202 identified the current page as the correct page for the insert. When the insertion point has been found, decision step 214 checks whether a matching record was found (an existing record at the insert point whose primary key matches the primary key of the INSERT record). Some DBMSs allow duplicate records, others do not. If a matching record was found and the DBMS does not allow duplicate keys decision step 222 directs the process to step 224 to perform error processing, including performing rollback processing and returning a suitable error status code to the caller. Otherwise, the process continues with phase 2 of insert processing at step 230 in FIG. 4B (all locks are kept).

FIG. 4B contains a flowchart of phase 2 insert processing. At decision step 232, the DBMS calculates whether enough unused space exists on the page to store the record to be inserted, along with the related control information. If so, processing continues with step 234; otherwise processing continues with step 262.

At step 234, the DBMS requests an upgrade from the RP lock on the page to a UP lock to prevent other transactions from splitting or merging the target page. If the lock is granted, decision step 236 directs the process to continue with step 238; otherwise the process continue with step 252. At step 252, if there was no error reported with the unsuccessful lock attempt, the transaction is put on a queue and when the lock can be granted the transaction is removed from the queue and the process continues with step 232 to re-validate that there is enough room on the target page for the record to be inserted. If the lock request causes an error, step 252 performs rollback processing and returns control to the caller with an error status code.

At step 238, the process performs the core of the insert processing by updating the slot table with the offset and length information for the record being inserted, updating the record count in the page header, updating the number of bytes used by records in the page header, and copying the record being inserted onto the target page.

At step 240, the DBMS requests an XUR lock on the INSERT record. If the lock cannot be granted, it is an irrecoverable error and the transaction's updates must be rolled back. The DBMS frees the XRR lock on record 0 at step 242 so other transactions can read records on the target page. Since the newly inserted record is protected by an XUR lock, no other transactions can read the record. At step 244, the companion page is created with the incremental data from the inserted record.

At this point in the insert process, the inserting transaction holds the following locks: a UP lock on the page, and an XUR lock on the newly inserted record. The DBMS returns control to the caller at step 246. If the insert processing is being performed on behalf of an update statement which was decomposed into a deleted followed by an insert, the processing may look for additional records to update and continue at step 300 (FIG. 5A) rather than returning control to the user.

Returning to step 262, the DBMS calculates whether enough space exists on the page to hold the record being inserted and its related control information when adding the number of bytes available in unused space and the number of bytes available in deleted records. If so, processing continues with step 280; otherwise processing continues with the page split process at step 264.

Step 264 begins the page split process. The DBMS requests an upgrade for the RP lock on the target page to an XUP lock to prevent other transactions from reading or modifying the page during the page split process. If the lock is granted, decision step 266 continues the processing with step 268; otherwise processing continues with step 252. At step 252, if the lock request did not cause an error, the process puts the transaction on a queue. When the lock can be granted, the transaction is removed from the queue and processing continues with step 268. For an error associated with the unsuccessful lock, the process performs rollback processing and returns control to the caller with an error status code.

At step 268, the target database page is split to make room for the record being inserted. The split processing acquires a new page, the "split page", onto which some of the records from the target page are written. The split processing also recaptures the space held by deleted records on the target page. Depending on the split technique, it may be necessary to search again for the insert point on the target page or split page at step 270. Any split technique, known in the art, may be used as long as it follows the locking protocol described herein.

The core of the insert processing is performed at step 272 by updating the slot table with the offset and length information for the record being inserted, updating the record count in the page header, updating the number of bytes used by records in the page header, and copying the record being inserted onto the target page. Since the transaction holds XUP locks on the target page and on the split page, at commit time it will be the only transaction accessing the page. Thus, the DBMS can write the target database page to the audit trail at commit time and there is no need to create a companion page.

At this point, the inserting transaction holds the following locks: 1) XUP lock on the target page; 2) XUP lock on the split page; 3) XRR lock on record 0 on the target page. The XUP lock on the target page eclipses this lock; and 4) XUP lock on the next level index page if a page split operation occurred. The processing continues with step 246 where the DBMS returns control to the caller or performs another update operation.

FIG. 4C contains a flowchart of a process for the recapture case of the phase 2 insert processing. Step 280 continues from decision step 262 of FIG. 4B, and the process proceeds to step 282, which begins the recapture process. At step 282, the DBMS requests an upgrade for the RP lock on the target page to an XUP lock to prevent other transactions from reading or modifying the page during the recapture process. If the lock is granted, decision step 284, continues the process with step 286; otherwise the process continues with step 292. If the lock request was unsuccessful and without error, the transaction is put on a queue at step 292. When the lock can be granted, the transaction is removed from the queue and the process continues with step 230 (FIG. 4B). At step 232 the DBMS revalidates that there is enough room on the page for the record being inserted. On this second time through step 232, the transaction holds an XUP lock on the target page, which is a stronger lock than the first time through. At step 234 or 264 when requesting a UP lock or XUP lock, the lock manager simply returns control to the caller, since an XUP lock is already held by the transaction. Holding a stronger lock on this second time through step 232 helps to ensure that the transaction will succeed without having to make a subsequent pass through step 232. In the event that there is enough space on the page, the transaction can proceed with the insert. In the event that there is not enough space on the page and the page must be split, the transaction holds the XUP lock on the page necessary to perform the page split.

If the lock was unsuccessful and caused an error, at step 292 rollback processing is performed and control is returned to the caller with an error status.

If the lock was successful, decision step 284 directs the process to step 286 where the space used by deleted records is recaptured. Step 286 compresses the records to remove the deleted records, leaving only active records on the page and updates the slot table with the new record offsets for the active records. The record being inserted will be copied at the end of the series of active records. Other embodiments may copy the record being inserted to a different location in the series of records.

At 288, the process updates the slot table with the offset and length information for the record being inserted, increments the record count in the page header, increments the number of bytes used by records in the page header, and copies the record onto the target page. Since the transaction holds an XUP lock on the target page, at commit time it will be the only transaction accessing the page. Thus, the DBMS can write the target database page to the audit trail at commit time and there is no need to create a companion page. At this point, the inserting transaction holds the following locks: an XUP lock on the target page, and an XRR lock on record 0. The XUP lock on the target page eclipses this lock.

The process returns control to the caller at step 290. If the insert processing was performed on behalf of an update statement, which was decomposed into delete and insert operations, the process may look for additional records to update and continue at step 300 rather than returning control to the user.

Figure 5A:
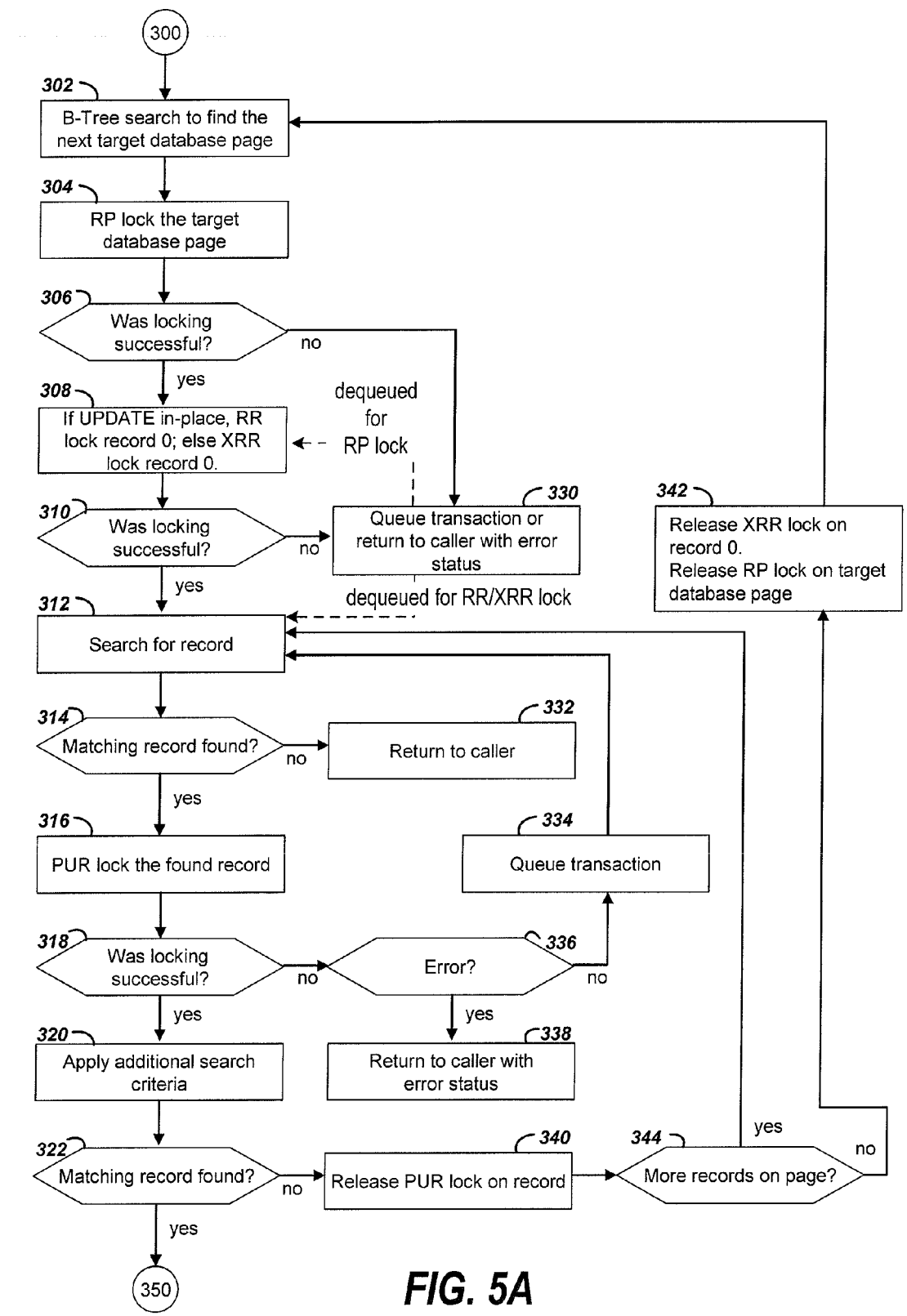
FIGS. 5A and 5B contain flowcharts of an example process for phase 1 processing common to both a delete and an update operation.
Figure 5B:
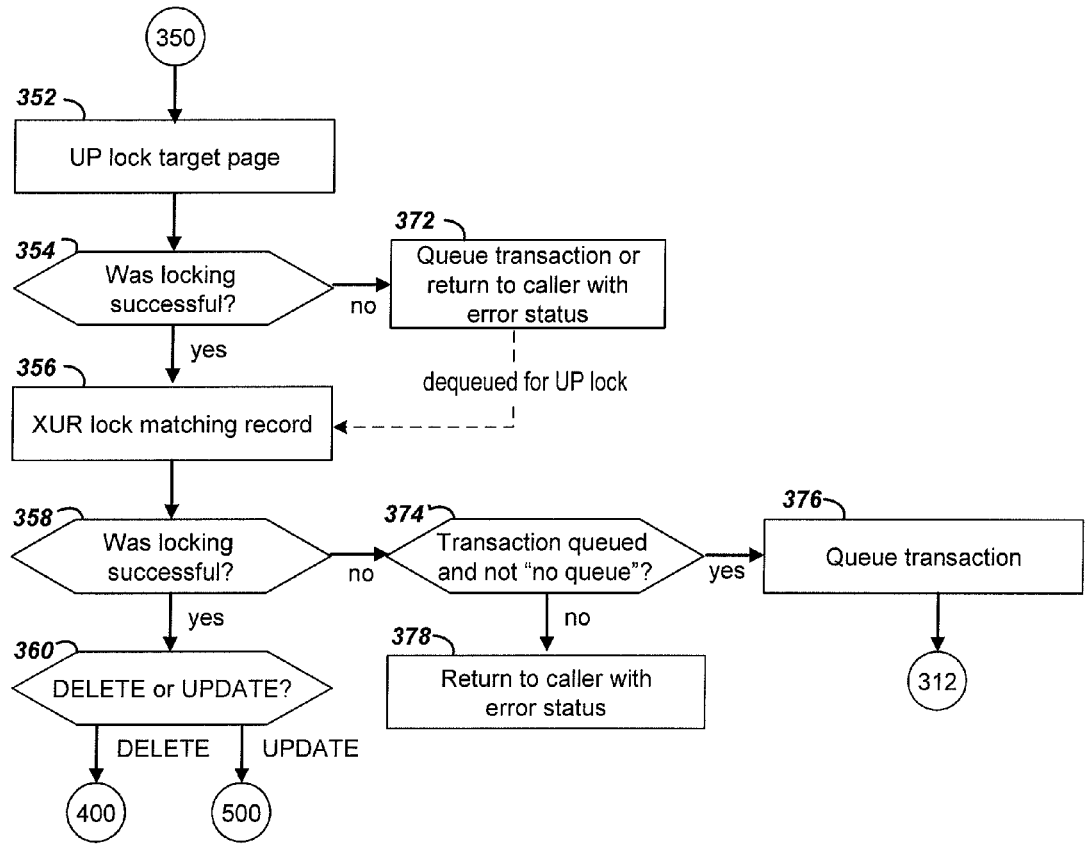

The processing for both delete and update operations has two phases: 1) a find/fetch phase wherein the DBMS locates the target record on the target database page, and 2) an update or deletion phase to complete the desired action. The phase 1 processing that is common to both delete and update processing is shown in FIGS. 5A and 5B. The process for performing a delete operation is show in FIG. 6, and the process for performing an update operation is shown in FIG. 7.

At step 302 the DBMS performs a B–Tree search to determine the next page containing a record matching the search criteria of the delete/update. The B–Tree structure does not guarantee that a matching record exists on the data page, but only points to the first page where it will occur, if it does exist. If the delete/update is performed using a primary key as the search criteria and primary keys are unique, only one record will match the search criteria. However, the delete/update statement may use a search criteria which matches many records.

For example, in a database which holds orders, some of whose information has been archived and which has an index on the column order_age, a database administrator might use the following statement to remove old orders:
DELETE FROM ORDERS WHERE order_age>90
The B–Tree search identifies the first data page where a record matching the search criteria may exist. The DBMS must then search on the data page for an actual matching record. Depending on the search criteria, the processing beginning at 300 may repeat several times until no more matching records have been found. All modifications to all records are later made permanent by a commit statement or are undone by a rollback statement.

After the first page has been identified at step 302, the DBMS at step 304 requests an RP lock on the page to prevent other transactions from performing a split or merge operation on the page. If the lock is granted, decision step 306 continues the process with step 308; otherwise the process continues with step 330. If the lock was not successful but was without error, the transaction is put on a queue, and when the lock can be granted, the transaction is removed from the queue and the process continues with step 308. Otherwise, if the lock request caused an error, rollback processing is performed and control is returned to the caller with an error status at step 330.

At 308, the process differentiates between an update in-place and an update-relocate or delete operation. The differences are explained in additional detail in the description of processing an update operation, which is provided below. If the update is an in-place update, the DBMS requests an RR lock on record 0 to prevent other transactions from splitting or merging the page while this transaction is searching for a matching record; otherwise an XRR lock is requested on record 0 to prevent other transactions from updating the page. The DBMS places an XRR lock rather than an RR lock on record 0 to avoid a potential deadlock situation if the RR lock had to be upgraded to XRR later in the processing after a matching record had been found. If the lock is granted, decision step 310 continues the process at step 312; otherwise the process continues with step 330. If the lock attempt was without error, the transaction is put on a queue, and when the lock can be granted the transaction is removed from the queue and the process continues with step 312. If the lock request causes an error, step 330 performs as described above.

The DBMS at step 312 searches the target page for a record that matches the search criteria. During this search process, the DBMS does not lock the individual records as it scans them, which advantageously allows the transaction to read other transactions insert and update operations before these database modifications are made permanent by a commit statement. Thus, the transaction is not blocked by other transactions locks. Before the record is modified, the DBMS requests a PUR lock at step 316, which will cause the transaction to queue if another transaction is performing an insert, update, or delete of the record.

If no matching record was found on the page 314, the process proceeds to step 332, where control is returned to the caller; otherwise the process continues with step 316. Table 4 below describes an example algorithm for the process of returning control to the caller at step 332.

TABLE 4

IF no records have ever matched the search criteria THEN
   Free the RP lock on the target database page
   Free the XRR lock on record 0
   At this point in the processing, the transaction holds no locks related to this UPDATE or DELETE operation.
ELSE
   At least one record matched the search criteria and was modified during this UPDATE or DELETE operation.
   At this point in the processing, the transaction holds various locks depending on the actions taken before getting to this step. See the discussions for the individual UPDATE in-place, UPDATE relocate, and DELETE operations Phase 2 for a discussion on the retained locks.
ENDIF
Return control to caller.

At step 316, the DBMS requests a PUR lock on the matching record to prevent other transactions from performing an update or delete on the record. If the lock is granted, decision step 318 continues the process with step 320; otherwise the process continues with decision step 336. If the lock was unsuccessful but did not cause an error, the transaction is put on a queue at step 334. When the lock can be granted, the transaction is removed from the queue and the process continues with step 312. The DBMS returns to step 312 because another transaction may have modified the matched record while this transaction was queued. The DBMS must verify that the record still matches the search criteria. If the lock request causes an error, at step 338 the process performs rollback processing and returns control to the caller with an error status.

Additional search criteria, if any, are applied against the record at step 320. For example, arithmetic operations may be performed on a record value. The following statement would flag orders greater than 45 days old whose fulfillment date occurred within the last week:

UPDATE ORDERS SET flag_for_review = 'YES' WHERE order_age > 45
   AND datediff(dd, fulfillment_date, CURRENT_DATE) <= 7

The DBMS uses the order_age expression during the B–Tree search in step 302 and during the record search of step 312 to find the first record on the page matching the order_age expression. The DBMS uses the fulfillment_date expression as additional search criteria at step 320.

If the record matches the additional search criteria, decision step 322 continues the processing with step 350. Otherwise, at step 340 the PUR lock on the record is released. Decision step 344 determines whether there are more records on the page. If so, the process continues with step 312. For example, if the search criteria for the DELETE statement were:
DELETE FROM ORDERS WHERE order_age>90 AND archived='YES'
many records on the target page could match the order_age>90 expression and fewer records match the archived='YES' expression. The DBMS continues searching records on the page until finding a match for the archived='YES' expression or reaching the end of the page.

If the DBMS has reached the end of the page without finding a match, decision step 344 directs the process to step 342 to release the XRR lock on record 0 and the RP lock on the target database page. The process continues searching on the next database page which matches the search criteria at step 302. In some DBMS implementations, this may require a full or partial B-Tree search. In other DBMS implementations, the search may continue to the "next" page in the database by following a pointer or other indicia. Continuing with the DELETE example, many records might match the search criteria order_age>90 and appear on multiple database pages. The DBMS searches each page until it finds a record matching all the search criteria, both the primary search criteria and the additional search criteria, or until the DBMS returns a 'no find' status at step 332.

When the DBMS reaches step 350, it has found a record which matches the complete search criteria. Continuing with step 352 in FIG. 5B, the DBMS requests an upgrade for the RP lock on the page to a UP lock. The UP and RP locks are identical with respect to their effect on serialization of the record updates (see Table 2). The UP lock could exist and be employed here for any of the following reasons: 1) to document the shift from a 'read' orientation to an 'update' orientation; 2) to indicate that records on this page will be updated—perhaps the locking system requires a UP lock on the page before an XUR lock can be granted on the record, and perhaps the locking system ignores record locks if an XUP lock is already held for the page; or 3) perhaps the DBMS supports other lock strengths not described by or required by this invention. If the lock is granted, decision step 354 continues the process with step 356; otherwise the process continues with step 372. At step 372 if there was not error with the lock request, the transaction is put on a queue. When the lock can be granted, the transaction is removed from the queue and processing continues with step 356. If the lock request causes an error, step 372 performs rollback processing and returns control to the caller with an error status.

At step 356, the DBMS requests an upgrade for the PUR lock on the record to a XUR lock to prevent other transactions from modifying the record with update or delete operations. If the lock is granted, decision step 358 continues with step 360; otherwise the process continues with step 374. If the lock request did return an error and the no-queue flag is not set, the transaction is put on a queue at step 376. When the lock can be granted, the transaction is removed from the queue and the process continues with step 312. The DBMS returns to step 312 because another transaction may have modified the matched record while this transaction was queued. The DBMS must verify that the record still matches the search criteria. If the lock request causes an error or the no-queue flag is set, the rollback processing is performed and control is returned to the caller with an error status at step 378.

Decision step 360 determines whether the operation is a delete operation or an update operation. For a delete operation, the process continues with step 400, which is in FIG. 6, and for an update operation the process continues with step 500, which is in FIG. 7. At this point in the processing, the transaction holds the following locks: 1) UP lock on the target page; 2) XUR lock on the matching record; and 3) XRR lock on record 0 (or RR lock on record 0 for UPDATE in-place).

Figure 6:
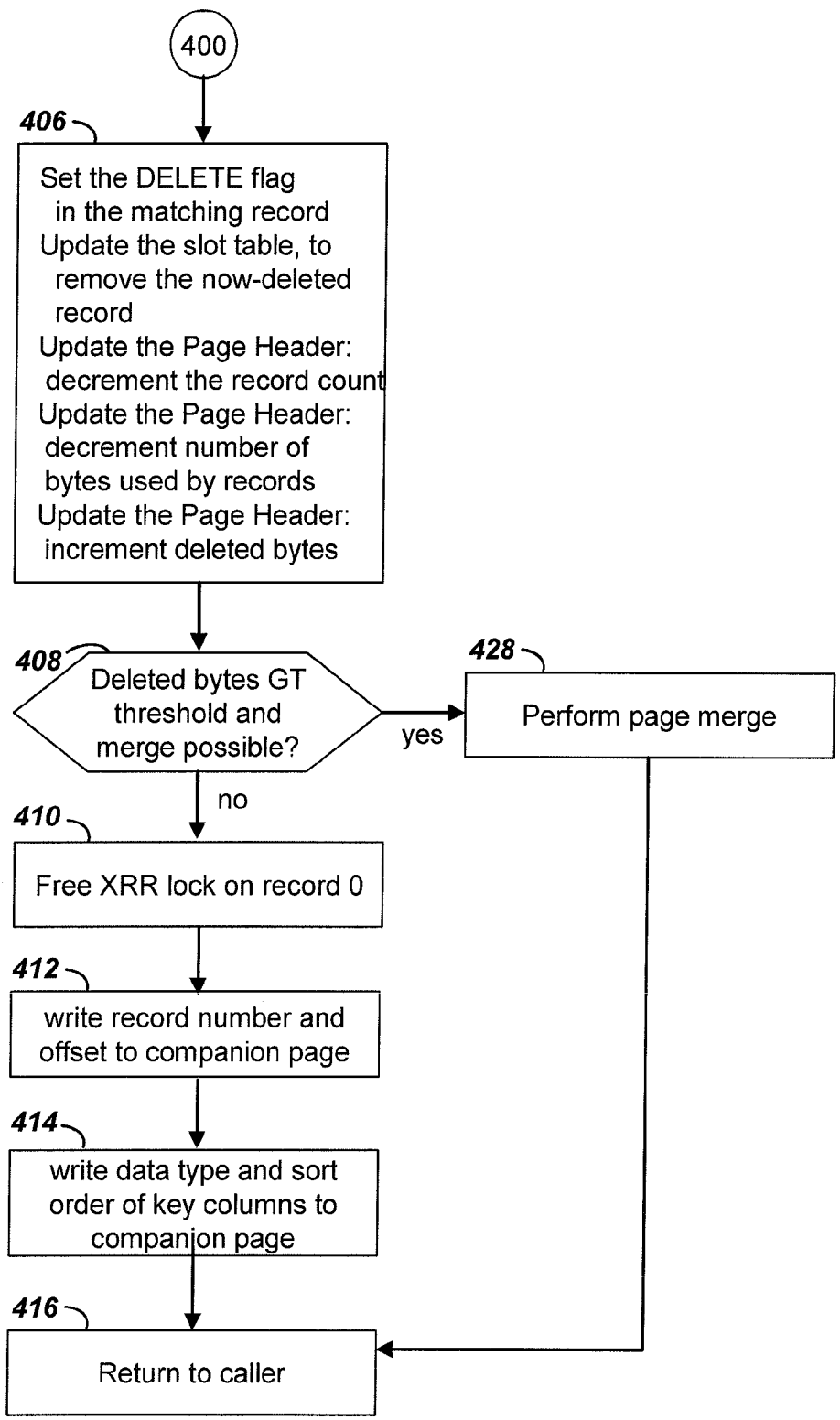
FIG. 6 contains a flowchart that shows the processing performed for a delete operation.
Figure 7:
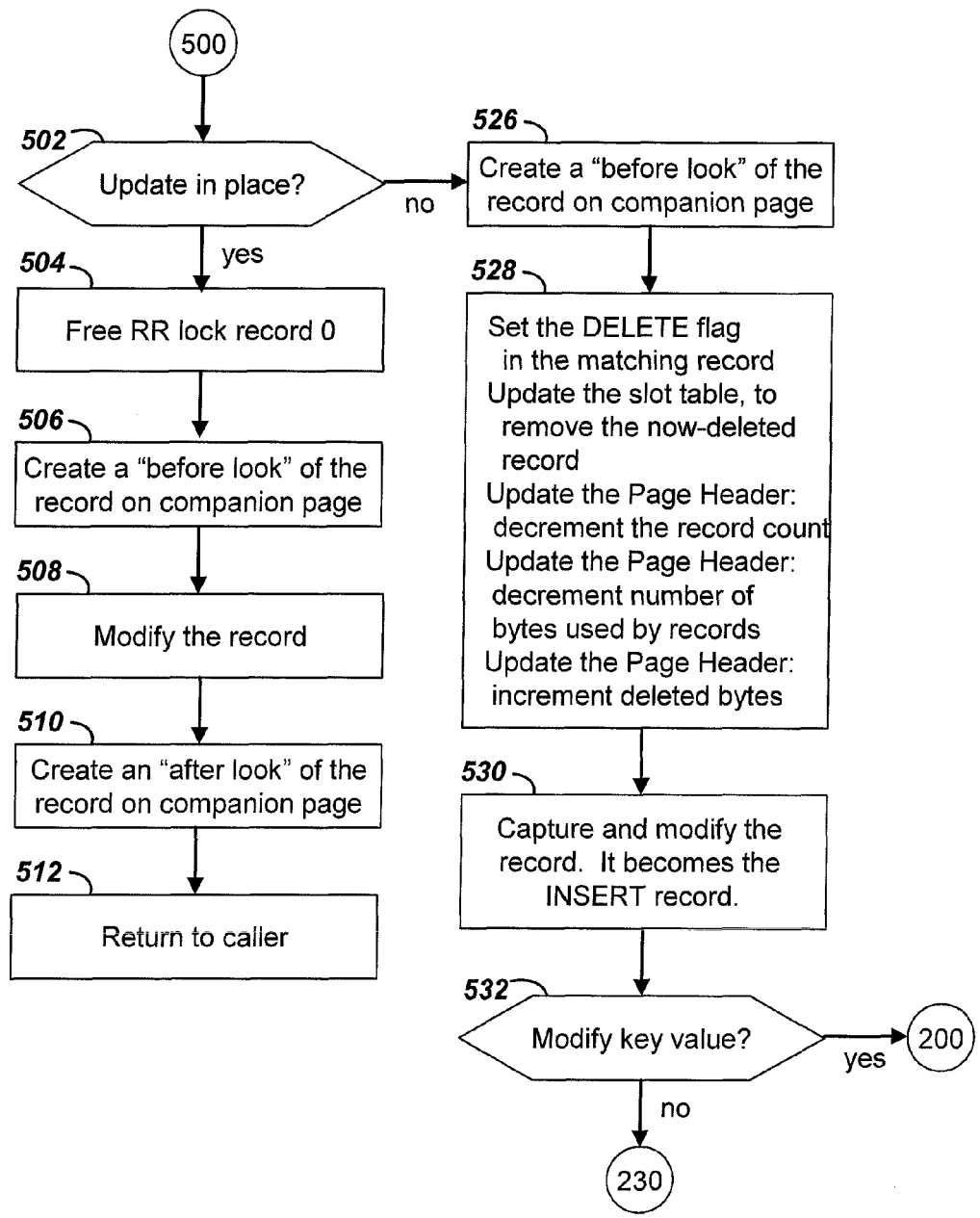
FIG. 7 contains a flowchart of an example process for performing an update operation.

FIG. 6 contains a flowchart that shows the processing performed for a delete operation. The delete operation has two phases: 1) a find/fetch phase wherein the DBMS locates the target record on the target database page as shown in FIGS. 5A and 5B; and 2) a deletion phase wherein the DBMS deletes the record as shown in FIG. 6. At step 406, the DBMS sets the delete flag in the matched record, updates the slot table to remove the now-deleted record, decrements the record count in the page header, decrements the number of bytes used by records in the page header, and increments the number of deleted bytes in the page header.

If decision step 408 finds that the number of deleted bytes has reached a threshold, for example, one-half the available space on the page and if the contents of the target page and an adjoining page will fit on the target page, the process continues with step 428 to perform page merging. Otherwise the process continues with step 410.

At step 428, the target database page is merged with an adjoining page if possible. The merge process combines the active records on the target page with active records from the prior or next data page onto the target page. At completion of the page merge, the transaction holds an XUP lock on the target page, an XUP lock on the adjoining page whose contents were merged with the current page, and an XUP lock on the next level index page. Any merge process, as known in the art, may be used as long as it follows the locking protocol described herein.

At step 410, the process frees the XRR lock on record 0 to allow other transactions to read or update the page. Information from the deleted record is captured into the companion page at step 412, including the record number and offset of the now-deleted record. At step 414, the process writes the data type and sort order of the key columns and their values to the companion page so the record can be re-inserted onto the page if the transaction chooses to rollback the delete operation. Since the record itself is not removed but only marked as deleted, the record data does not have to be copied to the companion page.

The process returns control to the caller at step 416. Alternatively, the process may instead return to step 300 to look for additional records to update rather than returning control to the user. For example, if the transaction invoked the DELETE operation as follows:

DELETE FROM ORDERS WHERE order_age>90 AND archived='YES' many records could match the search expression order_age>90. The process steps shown in FIGS. 5A-B and FIG. 6 remove one matching record. The DBMS must continue looking for additional records that match the search criteria.

At the end of phase 2 processing, the deleting transaction holds the following locks: 1) if no page merge took place, a UP lock on the page, and an XUR lock on the deleted record; 2) if a page merge took place, an XUP lock on the page, an XUR lock on the deleted record (the XUP lock on the target page eclipses this lock), an XRR lock on record 0 (the XUP lock on the target page eclipses this lock), and an XUP lock on the next level index page.

FIG. 7 contains a flowchart of an example process for performing an update operation. The described embodiments differentiate between an update which modifies a record "in-place" and an update which causes the record to be "relocated" because of a change to the primary key value or to be moved because the size of the record increases or decreases. The "update-in-place" operation is an optimization of the "update-relocate" operation.

The update operation has two phases: 1) a find/fetch phase wherein the DBMS locates the target record on the target database page as shown in FIGS. 5A-B; and 2) a modification phase wherein the DBMS modifies the record as shown in FIG. 7.

At step 502, the DBMS determines whether the record can be modified in-place. Columns whose values are a fixed length are candidates for in-place update. For example, a numeric value (integer, smallint, real, and so on), a date value, a Boolean value, a locator value (for example for a BLOB), or a fixed length character value may be modified in-place. Updates to variable length character columns are typically not candidates for in-place update. Updates to a primary key column are typically not candidates for in-place update since the update, usually causes the record to move to a different position in the slot table for the page or in the B+tree. If the update is a candidate for in-place update, the process continues at step 504. Otherwise the process continues at step 526.

At step 504, the RR lock on record 0 is freed to allow other transactions to modify other records on the page. The transaction holds an XUR lock on the record being updated as a consequence of UPDATE phase 1 processing. The XUR lock on the record prevents other transactions from updating or retrieving the record.

At 506, the process stores the data of the record before modification, often called a "before look" to the companion page. The DBMS uses the before look when the transaction uses rollback to undo the effect of the update. The record is modified according to the update statement at step 508, and step 510 stores the data of the record after modification in the companion page, often called an "after look." The DBMS uses the after look during database recovery. At step 512, the process returns control to the caller. At the end of update-in-place phase 2 processing, the transaction holds a UP lock on the page and an XUR lock on the modified record.

Returning to step 526, if the update cannot be made in-place, an update-relocate is in order and the DBMS decomposes the update into a delete operation followed by an insert operation. To simplify the explanation, the example scenario differentiates between an update which modifies a primary key value and an update which does not modify a primary key value. If the primary key is not updated, the insert operation attempts to write the modified record onto the same page. If the primary key is updated, the insert operation must first perform a B–Tree search to determine the correct page upon which to write the modified record. In an actual implementation, various optimizations would be used to further streamline the update-relocate processing.

Step 526 stores a before look of the record to the companion page. The DBMS uses the before look when the transaction uses rollback to undo the effect of the update. At step 528 the process sets the delete flag in the matched record, updates the slot table to remove the now-deleted record, decrements the record count in the page header, decrements the number of bytes used by records in the page header, and increments the number of deleted bytes in the page header. An optimization that may be performed here for the delete operation (as related to the update operation) is to suppress the possibility of a page merge, even if the number of deleted bytes now exceeds the merge threshold. This allows faster processing in the event the transaction uses rollback to undo the effects of the update. A subsequent delete operation on this page or on an adjoining page can perform the page merge.

At step 530, the process saves a copy of the record and modifies the contents, including clearing the delete flag. This copy becomes the record to be inserted for the subsequent processing steps. If the update modified a primary key column, decision step 532 continues the process with insert processing at step 200. Otherwise the process continues with INSERT processing at step 230. In an alternative embodiment, the copy of the record is made before the delete flag is set.

At the end of update-relocate phase 2 processing, the transaction holds the following locks: 1) if no page split took place during the INSERT processing steps, a UP lock on the page, an XUR lock on the deleted record, an XUR lock on the inserted record; and 2) if a page split took place during the INSERT processing steps, an XUP lock on the page, an XUR lock on the deleted record (the XUP lock on the target page eclipses this lock), an XRR lock on record 0 (the XUP lock on the target page eclipses this lock), and an XUP lock on the next level index page.

Figure 8:
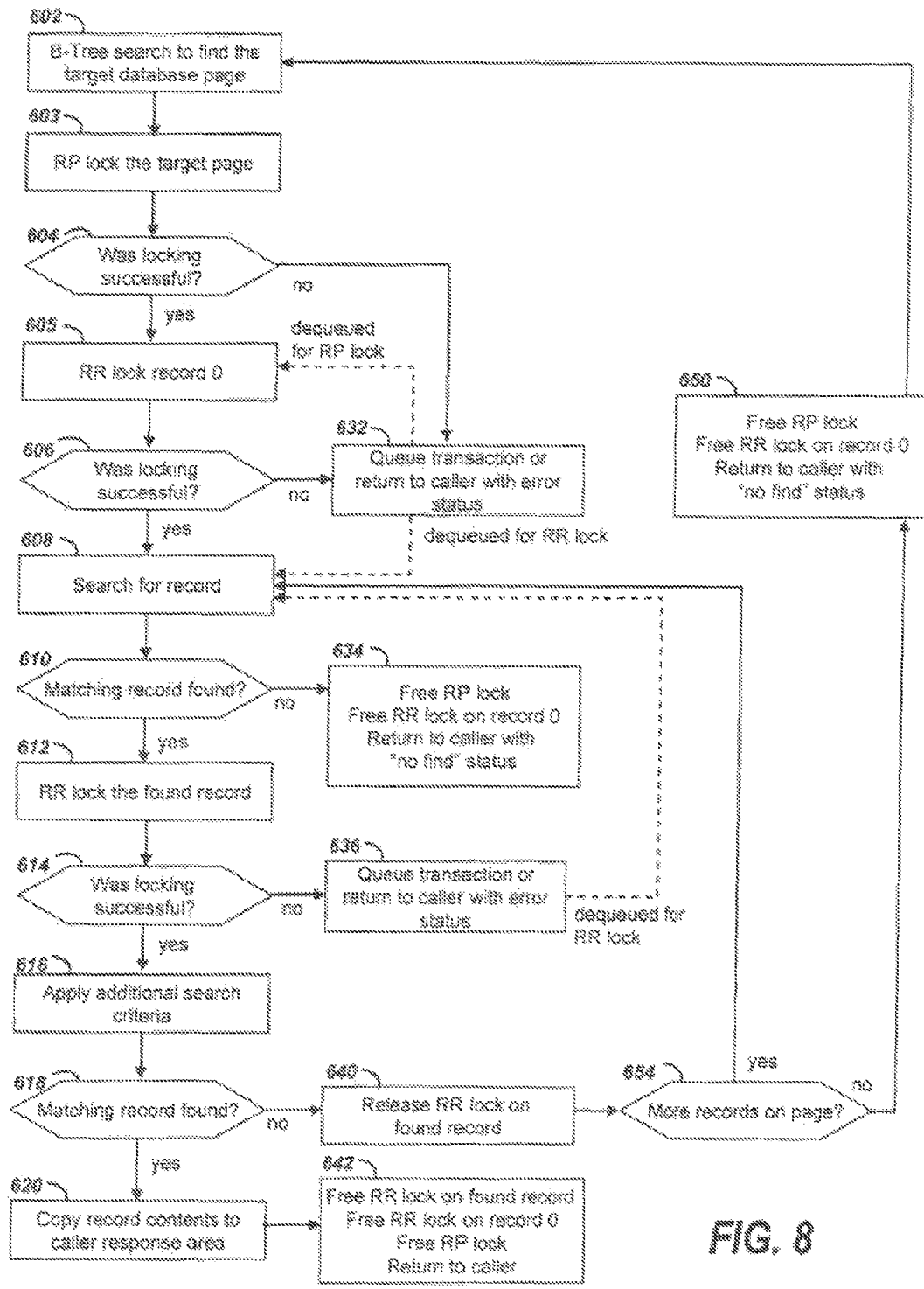
FIG. 8 contains a flowchart of an example process for reading a record from the database.

FIG. 8 contains a flowchart of an example process for reading a record from the database. To read a record from the database, the transaction uses a record locking strategy which interacts with the insert, update, and delete locking strategies. The read operation may be the result of an SQL FETCH statement, an SQL Singleton SELECT statement, or other means. The steps shown in FIG. 8 are similar to the steps required for the Phase 1 processing of the update and delete operations. The primary difference is in the locking protocol.

At step 602, the DBMS performs a B–Tree search to determine the target page for the record to be read. The B+tree structure does not guarantee that a matching record exists on the data page, but only points to the page where it will occur, if it does exist. The DBMS requests an RP lock on the page at step 603. This prevents other transactions from splitting or merging the page while this transaction searches for the target record. If the lock is granted, decision step 604 continues the process with step 605; otherwise the process continues with step 632. If the lock could not be granted and there was no error, the transaction is put on a queue at step 632, and when the lock can be granted the transaction is removed from the queue, with processing continuing at step 605. If the lock request causes an error, step 632 performs rollback processing and returns control to the caller with an error status.

The DBMS requests an RR lock on record zero at step 605. This prevents other transactions from updating the page while this transaction searches for the target record. If the lock is granted, decision step 606 continues the process with step 608; otherwise the process continues with step 632. If the lock could not be granted and there was no error, the transaction is put on a queue at step 632, and when the lock can be granted the transaction is removed from the queue, with processing continuing at step 608. If the lock request causes an error, step 632 performs rollback processing and returns control to the caller with an error status.

Table 5 shows the processing performed at step 608 in searching for the record.

TABLE 5

WHILE record NOT found and NOT end-of-page DO
  search for a matching record - do not lock individual records so that the
    processing may read other transactions' INSERTs and UPDATEs
ENDWHILE.

If a matching record is found, decision step 610 continues the process with step 612; otherwise the process continues with step 634. Step 634 frees the RP lock on the page, frees the RR lock on record 0, and returns a "no find" status to the caller.

At step 612, the DBMS requests an RR lock on the found record in order to prevent other transactions from updating this record while the DBMS applies additional search criteria and copies the contents of the record to the calling transaction's response area (if the record matches the complete search criteria). If the lock is granted, decision step 614 continues the process with step 616; otherwise the process continues with step 636. If the lock could not be granted and there was no error, the transaction is put on a queue at step 636, and when the lock can be granted the transaction is removed from the queue, with processing continuing at step 608. If the lock request causes an error, step 632 performs rollback processing and returns control to the caller with an error status. The DBMS returns to step 608 because another transaction may have modified the found record while this transaction was queued. The DBMS must verify that the found record still matches the search criteria.

Decision step 614 directs the process to step 616 if the lock was successful. At step 616, the DBMS applies additional search criteria against the record, if any. For example, the search criteria may require performing arithmetic operations on a record value. The following statement would flag orders greater than 45 days old whose fulfillment date occurred within the last week. The DBMS uses the order_age expression during the B-Tree search 602 and during the record search 608 to find the first record on the page matching the order_age expression. The DBMS uses the fulfillment_date expression as the additional search criteria of step 616.

---

SELECT * FROM order_table WHERE order_age > 45 AND datediff(dd, fulfillment_date, CURRENT_DATE) <= 7

---

If the record does not match the additional search criteria, decision step 618 continues the processing with step 640, where the DBMS releases the RR lock on the record. At decision step 654, the DBMS determines whether there are more records on the page. If so, the process continues with step 608. For the example search criteria for the following SELECT statement:
SELECT * FROM order_table WHERE order_age>90 AND archived='YES'
There may be many records on the target page that match the order_age>90 expression and fewer records match the archived='YES' expression. The DBMS continues searching records on the page until finding a match for the archived='YES' expression or reaching the end of the page.

If the DBMS has reached the end of the page without finding a match, decision step 654 continues the process at step 650, which releases the RR lock on record 0 and the RP lock on the target database page. The process then continues searching on the next database page which matches the search criteria at step 602. In some DBMS implementations, this may require a full or partial B-Tree search. In other DBMS implementations, the search may continue to the "next" page in the database by following a pointer or other indicia. Continuing with the SELECT example, many records might match the search criteria order_age>90 and appear on multiple database pages. The DBMS searches each page until it finds a record matching all the search criteria, both the primary search criteria and the additional search criteria, or until the DBMS returns a 'no find' status at step 634.

When the DBMS finds a matching record, decision step 618 continues the processing at step 620. Step 620 copies the contents of the matching record to the transaction's response area. The DBMS then frees the RP lock on the page, frees the RR lock on record 0, frees the RR lock on the found record, and returns to the caller at step 642. FIG. 8 describes searching and retrieval of a single record which matches the search criteria. Various optimizations may be made for searching and retrieving multiple records.

Figure 9:
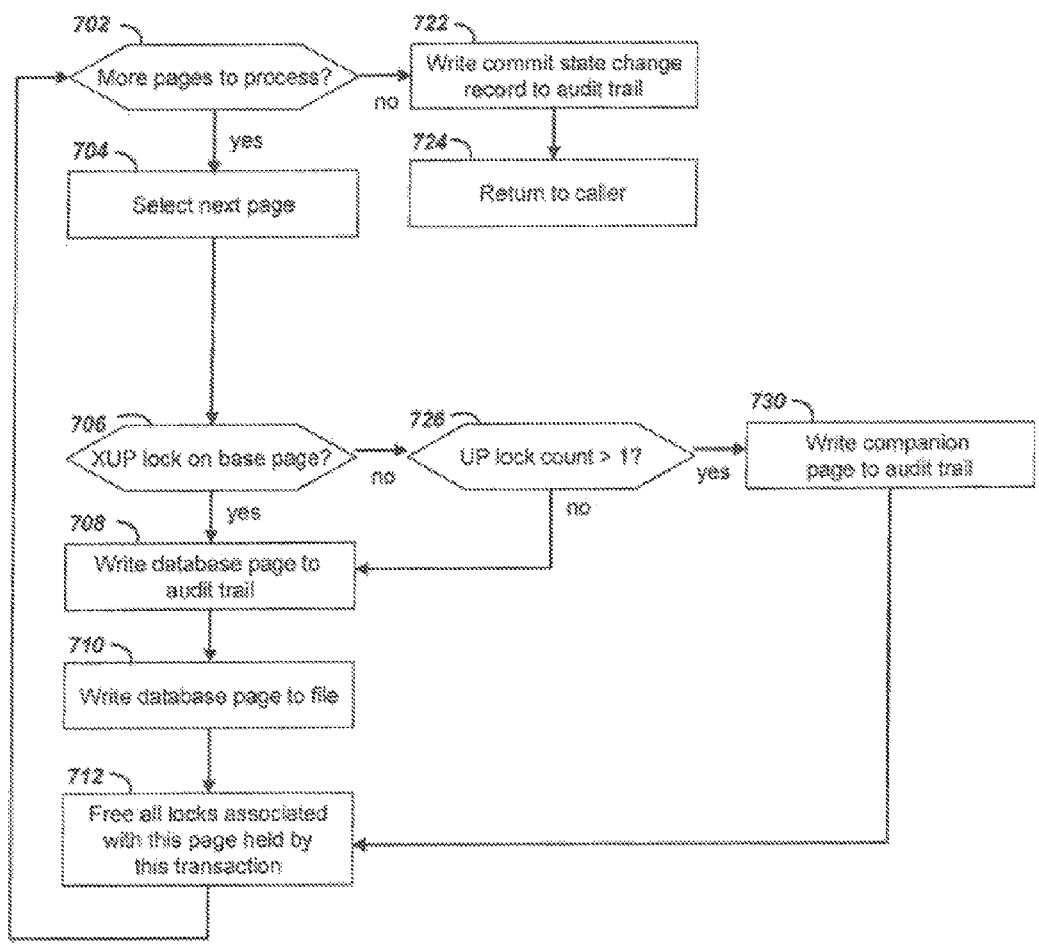
FIG. 9 contains a flowchart of an example process for committing a transaction.

FIG. 9 contains a flowchart of an example process for committing a transaction. The DBMS performs commit processing to make the effects of a transaction permanent when requested to do so by the transaction itself or by a transaction manager on behalf of the transaction, for example in the case of two-phase commit.

The transaction may have updated multiple pages, each of which may have a companion page. The DBMS processes one page at a time. At decision step 702, the DBMS checks to see if there are more database pages left to process. If not, step 722 writes the commit state change record to the audit trail, and step 724 returns control to the caller. Depending on the DBMS and transaction manager implementations, the transaction may complete (end-of-transaction state transition) following the COMMIT processing, or it may continue execution and may make additional updates to the database.

If there are more pages to process, at step 704 the DBMS selects the next database page to process from a list of updated pages. Decision step 706 checks if the transaction holds an XUP lock on the page, which indicates it is the only transaction holding a lock on the page. If so, the DBMS writes the database page to the audit trail at step 708 and at step 710 writes the database page to the database file from which the page was originally read. The DBMS frees the locks held by this transaction for this page at step 712 and returns to decision step 702 to check whether there are more pages to process.

If at decision step 706 the DBMS determines that the transaction does not hold an XUP lock on the page, the DBMS checks at decision step 726 if the transaction has the only UP lock on the page. That is, if the count of UP locks on the page equals 1, this transaction is the only transaction to hold an update lock (UP or XUP) on the page. If the UP lock count is not greater than 1, the DBMS continues at step 708 as described above.

If the count of UP locks on the page is greater than 1, decision step 726 continues the process at step 730 where the DBMS writes only the page modifications in a companion page to the audit trail. At some point in the future, a transaction will have an XUP lock or be the only transaction to hold a UP lock on the page and will write the database page, containing all updates, to the audit trail and to the file. The process does not write the updates to the database file in order to optimize recovery processing. An alternative embodiment writes updates to the database file at commit time and then at recovery time selectively undoes the updates if needed. After writing the companion page to the audit trail, the DBMS free the locks held by this transaction for this page at step 712 and continues the process at step 702.

It will be appreciated that if an unrecoverable error occurs while writing to the audit trail or to the database file, the DBMS initiates rollback processing and undoes the transaction's updates.

Figure 10A:
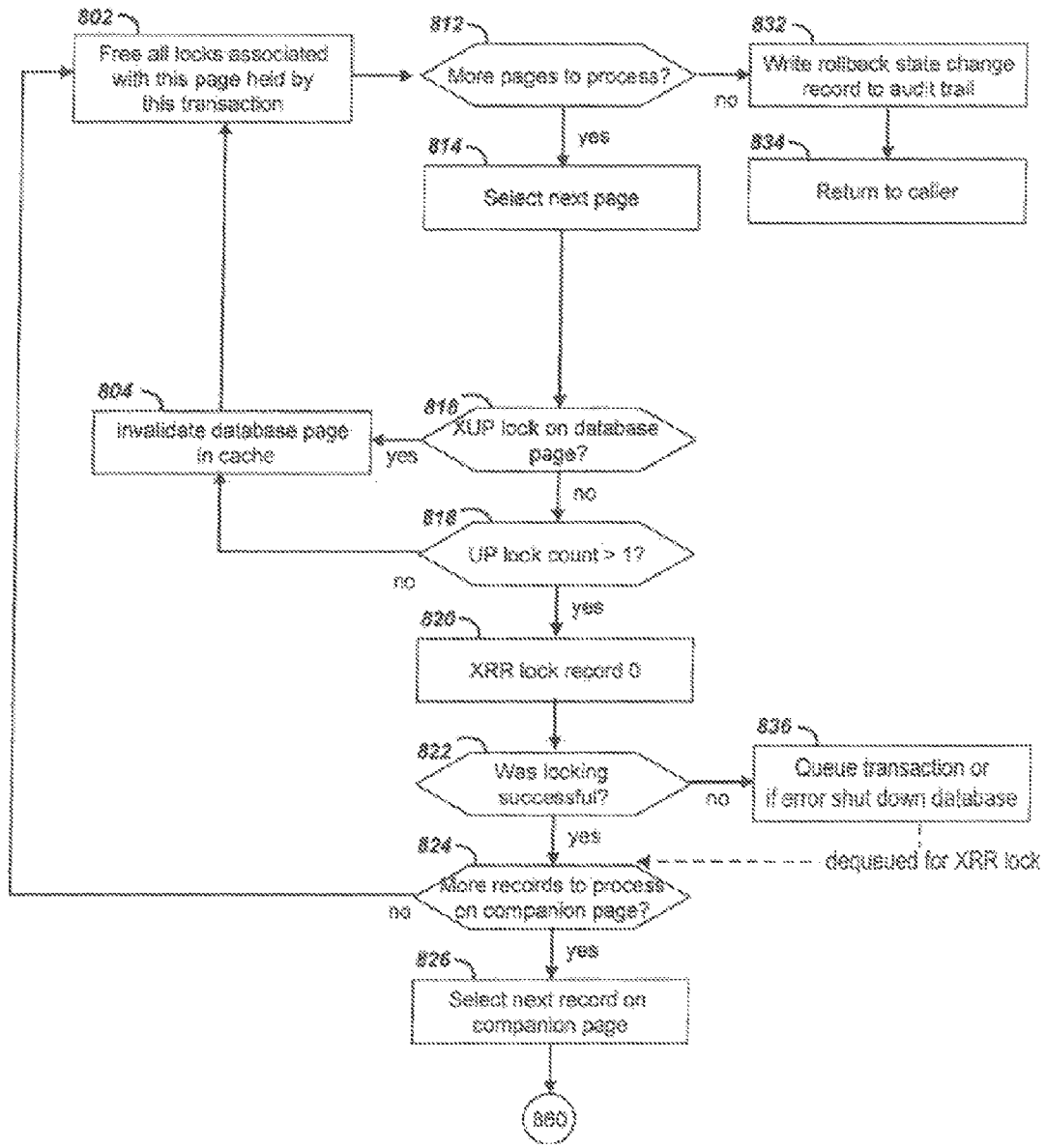
FIGS. 10A and 10B contain flowcharts of an example process for rollback processing by the DBMS.
Figure 10B:
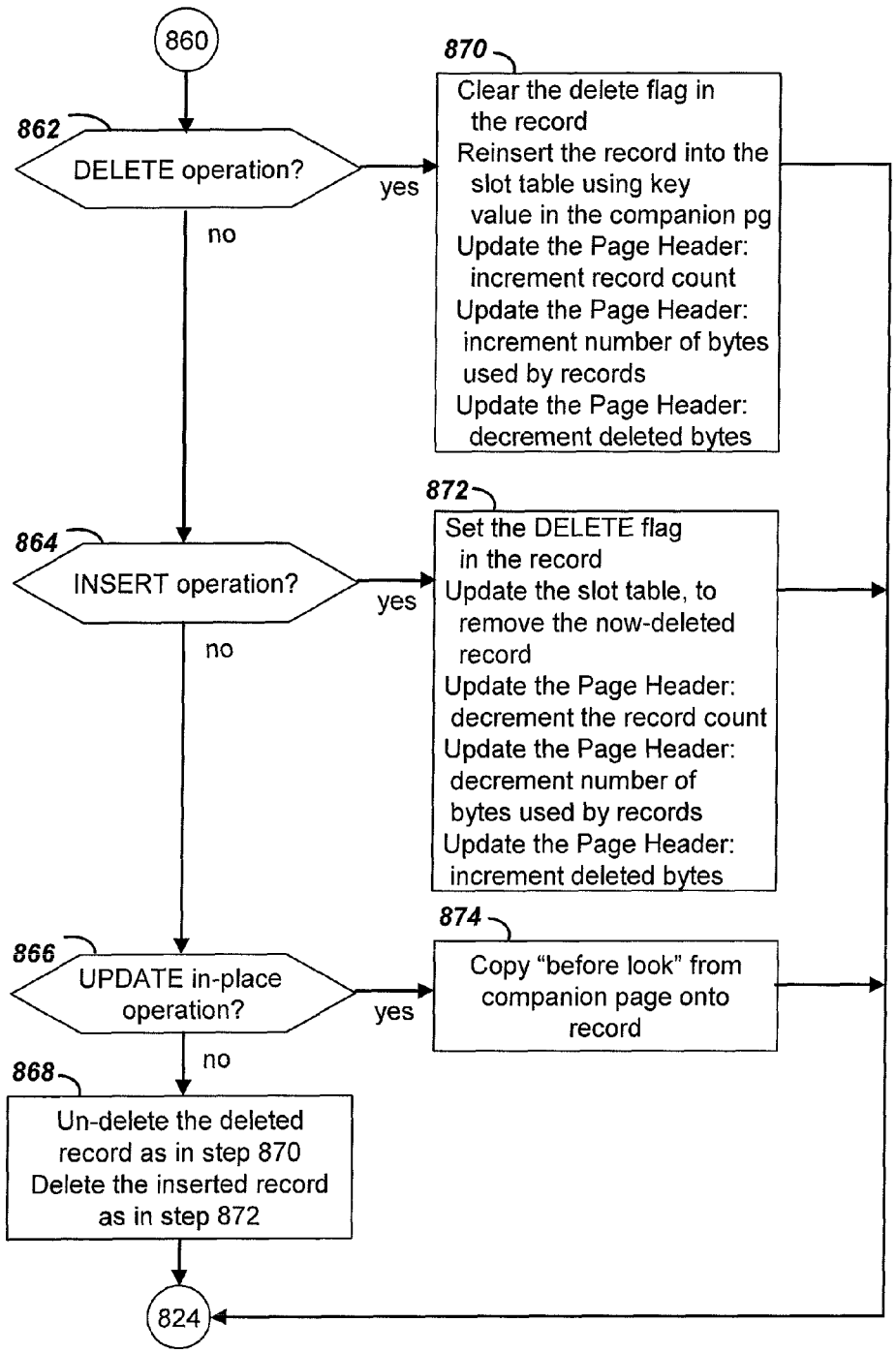

FIGS. 10A and 10B contain flowcharts of an example process for rollback processing by the DBMS. The DBMS performs rollback processing to "undo" the effects of a transaction in the following two cases: 1) because an error was detected in processing, for example during a lock request; or 2) as requested by the transaction itself or by a transaction manager on behalf of the transaction, for example in the case of a two-phase commit.

The transaction may have updated multiple pages, each of which may have a companion page. The DBMS processes one page at a time. At decision step 812, the DBMS checks to see if there are more pages left to process. If not, step 832 writes the rollback state change record to the audit trail, and step 834 returns control to the caller.

If there are more pages to process, step 814 selects the next page from a list of updated pages. Decision step 816 checks if the transaction holds an XUP lock on the page, which indicates that the transaction is the only transaction holding a lock on the page. If the transaction holds an XUP lock, the DBMS rolls back the update by invalidating the page at step 804. Since there are no other transactions updating records on the page and the transaction has not committed, the page in persistent storage contains the version of the page prior to the change made by the transaction. Thus, by invalidating the in-cache version of the page the DBMS will read the page from persistent storage into cache memory the next time the page is needed.

If the transaction does not hold an XUP lock on the page, decision step 818 checks to see if the transaction has the only UP lock on the page. If the count of UP locks on the page equals 1, this transaction is the only transaction to hold an update lock (UP or XUP) on the page. If the lock count is greater than 1, the DBMS invalidates the in-cache page at step 804, and frees all the locks on this page associated with this transaction at step 802. The process continues at step 812 as described above.

If the count of UP locks on the page is greater than 1, the rollback processing must "undo" the effects of the transaction individually. At step 820, the DBMS requests an XRR lock on record 0. This prevents other transactions from updating the page while the DBMS performs the rollback of this transaction's updates to this page. If the lock is granted, decision step 822 continues the process at step 824; otherwise the process continues with step 836. If the lock was unsuccessful and without error, the DBMS puts the transaction on a queue at step 836. When the lock can be granted, the DBMS removes the transaction from the queue and continues at decision step 824. If the lock request was unsuccessful and caused an error, the DBMS shuts down at step 836 and the database administrator must perform database recovery.

The transaction may have updated multiple records on the page, each of which has a corresponding record on the companion page. The DBMS processes one companion record at a time. At decision step 824, the DBMS checks to see if there are more records left to process on the companion page. If there are no more records to process on the companion page, the DBMS frees all the locks on this page associated with this transaction at step 802 and continues with decision step 812 as described above. If there are more records to process on the companion page, the DBMS selects the next record at step 826 and processes the record at step 860, which continues on FIG. 10B.

FIG. 10B contains a flowchart of a process for rolling back a record on a companion page. The processing of the record on the companion page depends on the operation that was performed (delete, insert, or update). For a delete operation, decision step 862, directs the process to step 870. The rollback task is to re-insert the record. The record still exists on the page and has the delete flag set. Step 870 clears the delete flag, reinserts the record into the slot table using the key value and column meta-data stored in the companion record, updates the page header so the record is accounted for by incrementing the record count, incrementing the number of bytes used by records, and decrementing the number of deleted bytes. If the delete operation caused a page merge operation, the transaction would hold an XUP lock on the page at decision step 816 and this processing would not be performed.

For an insert operation, decision step 864 directs the process to step 872. The rollback task is to delete the record and not actually remove it from the page. This is an optimization to the processing. In another embodiment, the rollback processing could delete the record and reclaim the space as well. At step 872, the DBMS sets the delete flag in the record and updates the slot table to remove the inserted, now-deleted record. The page header is updated so the now-deleted record is accounted for by decrementing the record count, decrementing the number of bytes used by records, and incrementing the number of deleted bytes.

For an update-in-place operation, decision step 866 directs the process to step 874. At step 874, the DBMS copies the before look from the companion page onto the base record. For an update-relocate operation, the process is directed to step 868 where the DBMS undoes the effect of the update-relocate processing by un-deleting the deleted record as in step 870 and deleting the inserted record as in step 872. If the inserted record was relocated to a different page, this companion page contains only the delete portion of the update-relocate operation. Another companion page or database page has the insert portion.

Processing steps 868, 870, 872, and 874 continue to step 824 in FIG. 10A where the DBMS looks for a next record to process on the companion page.

Depending on the DBMS and transaction manager implementations, the transaction may complete (end-of-transaction state transition) following the rollback processing, or it may continue execution and may make additional updates to the database.

FIGS. 11A-F illustrate processing and data structures used in recovery processing. The process shown by the flowchart of FIG. 11A may be performed by a recovery tool, which is provided by the DBMS. The recovery tool reads the audit trail and reapplies updates to re-establish the integrity of the database.

The recovery process can be very complex, involving issues such as how to establish a start point in the audit trail, how to recover from hardware and other errors during the recovery process, and how to handle different audit trail media (e.g., tape, disk, solid state storage or other devices). The recovery process is enabled by additional processes, technologies, and tools, including issues such as periodic full backups, incremental backups, as well as the on-going audit trail entries made during the transaction processing as described in the previous discussion. Handling these and other related issues is not a focus of this description. This description focuses handling the audit trail entries made during processing according to embodiments of the present invention.

The following description assumes that known or customized techniques may be used to identify the first audit trail entry for each transaction; the audit trail is readable and writable during the recovery process, as are the database files; and the audit trail contains other entries along with the ones related to embodiments of the present invention.

The description also assumes that each completed transaction has the following sequence of entries in the audit trail: a) zero or more database page or companion page images; b) prepared state transition if the transaction is part of two-phase commit; and c) rollback or commit state transition. If the transaction does not complete, for example, because of a system crash, the entries for b) and c) may not appear in the audit trail. In alternative embodiments, different or differently-named entries will appear. For example, a start-of-transaction entry may appear as opposed to the first database page or companion page acting as the signal for the start-of-transaction state transition. Similarly, an end-of-transaction state transition may appear, following the commit or rollback state transition. The end-of-transaction state transition allows multiple sets of page updates and commits or rollbacks to be associated with the same transaction for reporting or other purposes. The embodiments of the present invention require only the companion or database page entries followed by a rollback or commit state transition entry.

In order to simplify description of the embodiments of the present invention, the description assumes that the timestamp for the audit trail entry is sufficient to guarantee correct serialization of the entries and their corresponding updates. Alternative embodiments may use other serialization techniques.

The description assumes that the companion pages and database pages may appear on the audit trail in any order and may interleave each other, depending on how the auditing mechanism caches pages before writing them to the audit trail. However, the commit entries on the audit trail must appear in timestamp order.

Those skilled in the art will recognize that the invention is not limited to transactions and databases involving a single file and a single table. The examples in the description below assume that the set of transactions on the audit trail update the same file for the same table. Those skilled in the art will recognize how the described techniques may be adapted to work with scenarios involving multiple files and/or multiple table updates. For example, the page chains described below would be maintained on a per file, per table basis rather than as a single chain, or alternatively with additional descriptive information within each entry in the single chain.

The following three general scenarios are handled by the various embodiments of the invention: all transactions are inserts; the transactions are mixed between inserters and updaters, and all transactions are updates. In all scenarios the description assumes that the transactions are designed to commit modifications.

Where all the transactions are inserts, because a finite number of records may be inserted onto a page, at some point the page split mechanism gets invoked. At that point one transaction acquires an XUP lock on the page and writes the database page to the audit trail.

Where the transactions include a combination of inserts and updates, because each page holds a finite number of records, at some point the page must be split and the splitting transaction will acquire an XUP lock on the page and will write the database page to the audit trail.

Where the transactions are all updates, there exists a type of table that all or most transactions update. For example, a system which processes deposits and withdrawals from a bank may have a table containing the current running balance for each branch. Each transaction updates the branch balance to reflect the deposit or withdrawal made by the transaction. Each concurrent transaction might update a different branch's balance but some number of branch balances, perhaps numbered in the hundreds, will appear on each page. For pages belonging to this kind of table, the situation where the number of UP locks on the page equals 1 happens very rarely. Thus, the database page is written to the audit trail rarely. The recovery mechanism handles this case. However, the time required to re-apply updates stored on companion pages may be excessive.

Figure 11A:
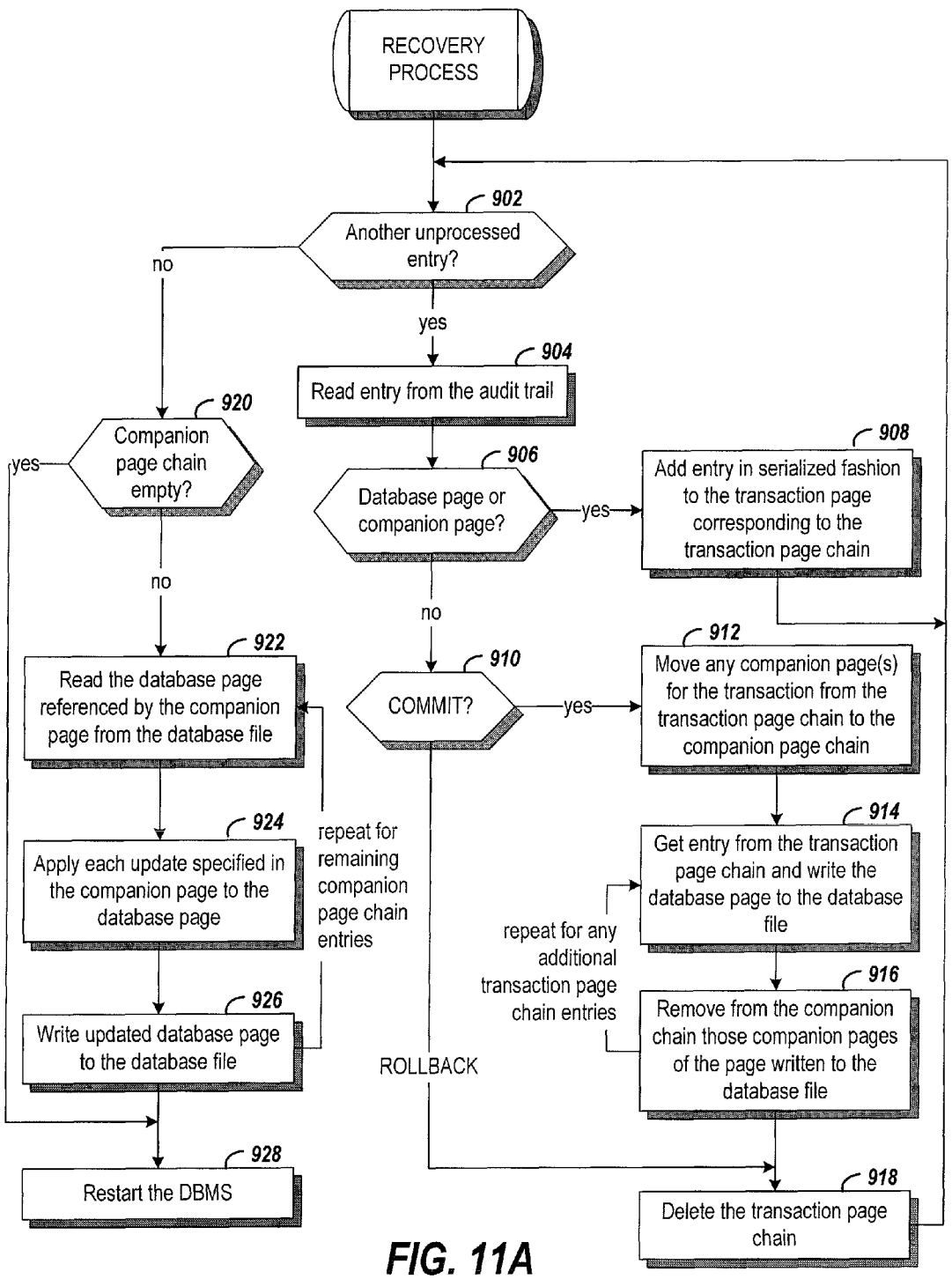
FIG. 11A is a flowchart of an example process for performing recovery of a database using an audit trail in accordance with various embodiments of the present invention.

FIG. 11A is a flowchart of an example process for performing recovery of a database using an audit trail in accordance with various embodiments of the present invention. FIGS. 11B-F illustrate example data structures used in the recovery process. The general steps of the recovery process are to process the audit trail to generate a companion page chain and a transaction page chain, apply committed updates to the database, and then restart the database.

Figure 11B:
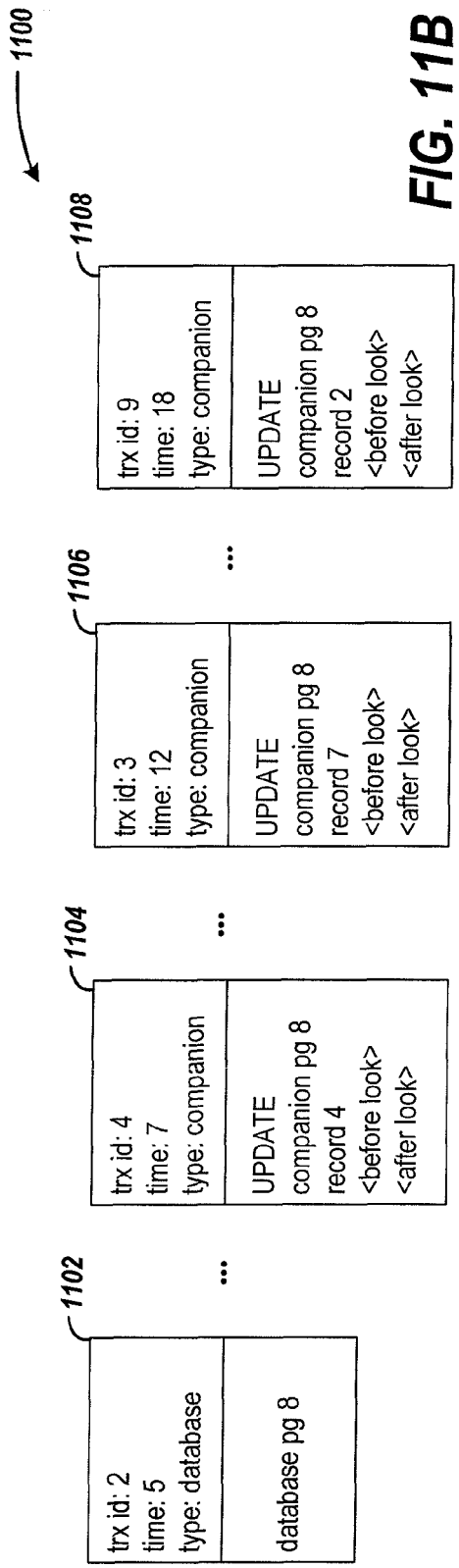
FIG. 11B shows an example audit trail containing entries for a sequence of updates to a page.

In generating the transaction page chain and companion page chain from the audit trail, the recovery process ensures a consistent state for the audit trail and determines the starting point for the recovery process. Along with requirements known to those skilled in the art for establishing a starting point for the recovery process, the embodiments of the present invention find the starting point that is at least far enough back on the audit trail such that the recovery process will write at least one database page for each page with related companion pages. FIG. 11B illustrates example companion pages in the audit trail 1100 for determining a starting point in a first scenario, and FIG. 11C illustrates example companion pages in the audit trail 1100 for determining a starting point in a second scenario.

In FIG. 11B, the audit trail 1100 contains entries 1102, 1104, 1106, and 1108 for a sequence of updates to page 8. The start point will include audit trail entry 1102 made by transaction 2 at time 5 in order to first recover a good page 8 before applying the updates specified by the later companion pages in entries 1104, 1106, and 1108.

Figure 11C:
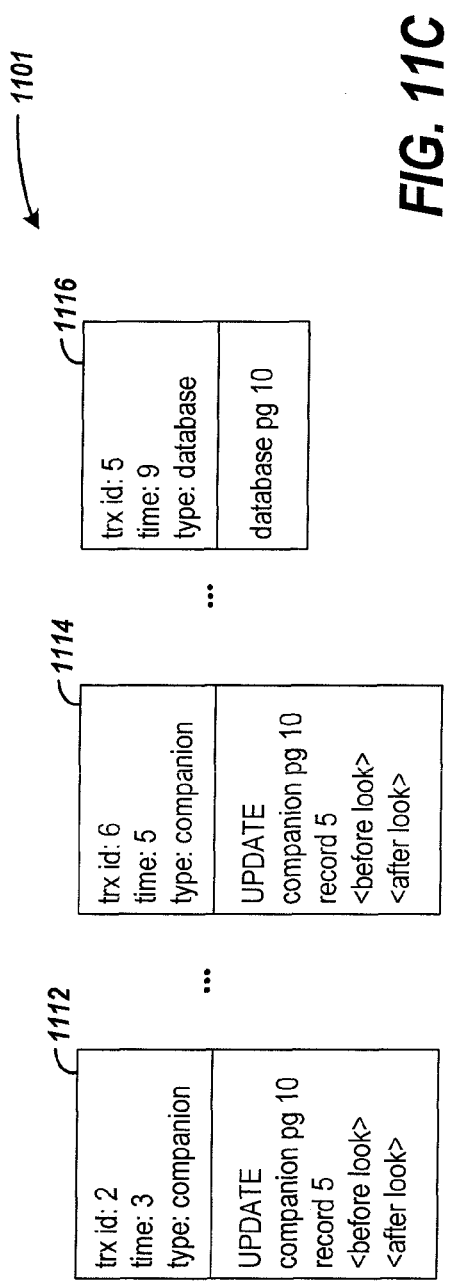
FIG. 11C shows a second example of the audit trail containing entries for another sequence of updates to another database page.

In FIG. 11C, the audit trail 1101 contains entries 1112, 1114, and 1116 for a sequence of updates to database page 10. The start point will include the database page entry made by transaction 5 at time 9, thereby excluding the entries for updates made by transactions 2 and 6. The entries 1112 and 1114 are not needed for recovery because database page 10 in entry 1116 contains updates made by those transactions.

Decision step 902 checks whether there is another unprocessed entry on the audit trail. If there is, another entry is read from the audit trail at step 904. Decision step 906 checks whether the entry read at step 904 is for either a database page or a companion page. For either type of entry, the process proceeds to step 908, where the entry is added in serialized fashion to the transaction page corresponding to the transaction page chain for that transaction. The following description and examples further explain the transaction chain.

Since multiple transactions execute simultaneously and each writes entries onto the audit trail asynchronously, the order of all entries on the audit trail is indeterminate. However, because each entry has a timestamp, the set of updates can be serialized. The relationship between entries made by the transactions range from simple (each updates a different set of pages) to complex (each updates the same record on the same page).

FIGS. 11D and 11E contain two examples of entries on a partial audit trail. In the examples, the timestamp entries are noted as simple integer values. Time 2 occurs after time 1; time 3 occurs after time 2, and so on. The description assumes that each timestamp is unique. Due to the asynchronous writes made by the transactions onto the audit trail, the order of the entries on the audit trail may be different from the timestamp order of the entries. The recovery process uses the timestamps to serialize the entries in the transaction page chain.

In processing audit trail 1130 of FIG. 11D, when entry 1132 is the first entry read, the recovery process makes a new transaction chain for transaction ID 1, and the transaction chain contains the database page 10. When the next entry 1134 is read a new transaction chain is created and stored for transaction ID 2. The transaction chain for transaction ID 2 contains the database page 8. When entry 1136 is read, the process stores an entry having database page 11 in the existing transaction chain for transaction ID 1; the new entry is stored in timestamp order for the transaction ID 1 entries. The process next reads entry 1138 and stores an entry having database page 9 in the existing transaction chain of transaction ID 2; the new entry is stored in timestamp order in the chain of transaction ID 2. When the process encounters the COMMIT state change in entry 1140 for transaction ID 1, decision step 906 finds that the entry is neither a database page nor a companion page and directs the process to decision step 910. Decision step 910 determines whether the state change of the transaction is COMMIT or ROLLBACK. For the COMMIT state, the process proceeds to step 912 to process the transaction chain. For a ROLLBACK state, the process deletes the transaction chain at step 918 and returns to decision step 902.

Before describing the steps performed in processing the transaction chain at steps 912-916 when a COMMIT state is found, a second example is shown in FIG. 11E and introduced below. The example will be referenced in the processing of steps 912-916.

FIG. 11E shows an example audit trail 1150. As in the example audit trail 1130 of FIG. 11D, the recovery tool creates a transaction page chain for each transaction. The transaction page chain for transaction ID 1 contains companion page 8 followed by database page 11. The transaction page chain for transaction ID 2 contains companion page 10 followed by database page 8.

The recovery process builds a companion page chain from the transaction chains. Each set of entries in the companion page chain pertains to the updates made to a database page by the transactions on the audit trail. When a COMMIT state change entry for a transaction is read from the audit trail, the process stores the transaction's companion pages (from the transaction page chain) to the companion page chain at step 912. The companion page entries in the companion page chain are stored in COMMIT timestamp order.

Figure 11F:
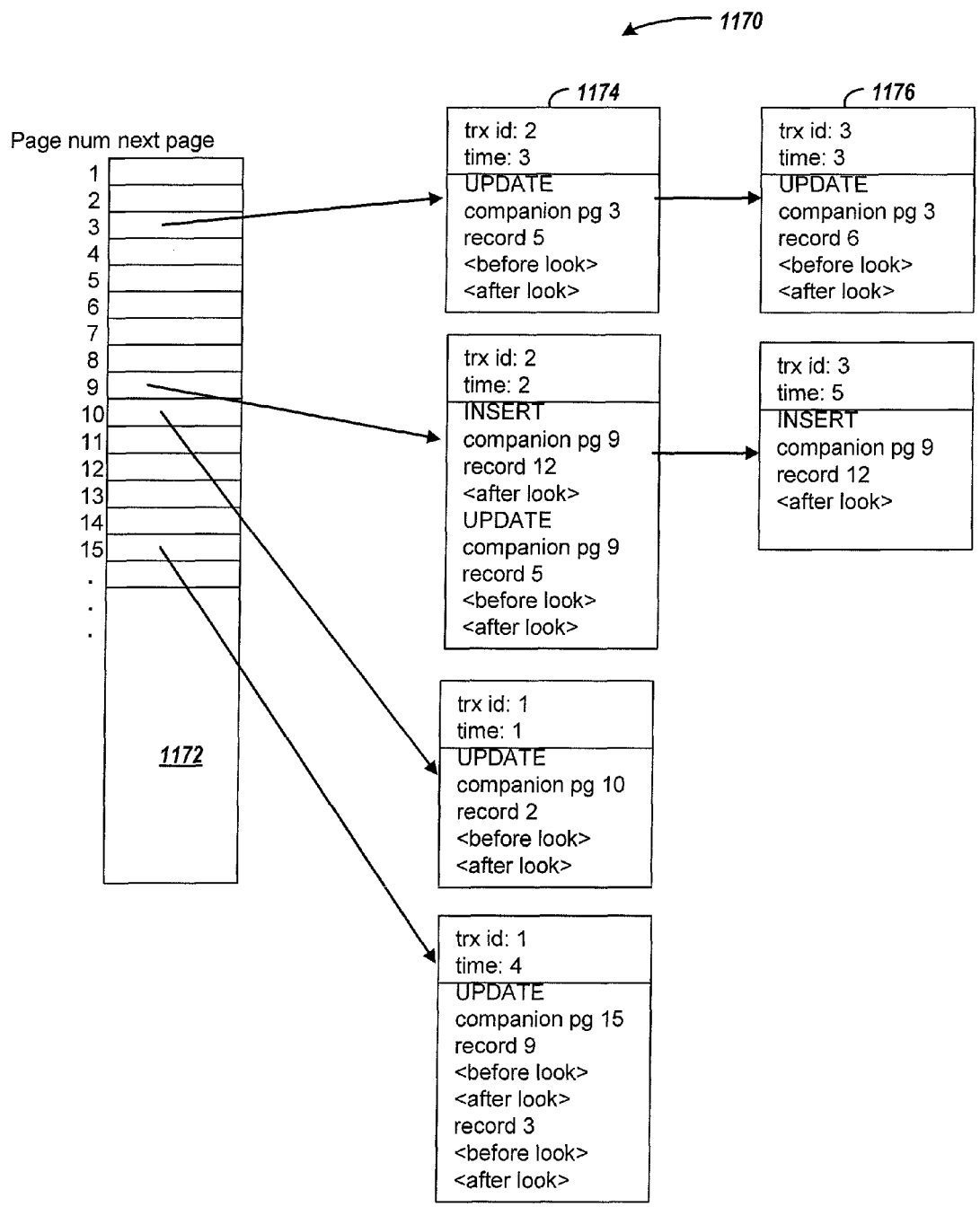
FIG. 11F shows an example companion page chain.

FIG. 11F shows an example companion page chain 1170. Note that the example entries companion page chain 1170 do not correspond to the entries in the audit trail 1150 in FIG. 11E.

On the left is the index for the companion page chain. In one embodiment, the companion page chain may be implemented as an array. In an alternative embodiment, a hash table may be used. Each cell in the index 1172 corresponds to a page in the database. Each cell is used to reference a companion page "sub-chain" or a "set" of companion page entries for the corresponding database page.

A set of companion page entries for a database page may result from multiple transactions. For example, the companion page entries 1174 and 1176 for database page 3 are from transaction IDs 2 and 3. A transaction may have companion page entries for multiple pages. For example, transaction ID 2 has companion page entries for pages 3 and 9.

The COMMIT entries in the audit trail for multiple transactions affecting the same database page determine in part the order in which the companion page entries are positioned in the companion chain. The example of FIG. 11E does not illustrate all possible orderings under this rule. For example, if a transaction ID 1 has a companion page with a timestamp that is later than a timestamp for a companion page for transaction ID 2 and the COMMIT entry in the audit trail for transaction ID 1 has a timestamp that is earlier than the COMMIT entry for transaction ID 2, the companion page for transaction ID 1 will be positioned in the companion page chain before the companion page for transaction ID 2 (because transaction ID 1 committed first). Thus, the companion page entries may not necessarily be in timestamp order in the companion page chain.

After moving the companion pages from the transaction page chain to the companion page chain at step 912, the database pages in the transaction page chain are processed in step 914. The process reads each entry from the transaction page chain and writes that page to the database file. At step 916, the process searches the companion page chain for companion page entries that modify the same page, and removes those companion page entries from the companion page chain. The database page, whose timestamp must follow the timestamps in the companion pages, contains all the updates reflected in the companion pages. Thus, the companion pages related to the database page can be deleted from the companion page chain and their updates ignored.

In performing steps 912-916 on the example audit trail 1150 of FIG. 11E, when the process finds the COMMIT state change entry for transaction ID 1 in the audit trail (decision step 910), the entry from companion page 8 is moved from the transaction ID 1 transaction chain to the companion page chain for page 8 (step 912). When at step 914 the process finds the database page entry for page 11 in the transaction page chain for transaction ID 1, the database page 11 from the transaction page chain is written to the database file. Step 916 searches and removes any companion page entries on the companion page chain for page 11. After all the pages in the transaction page chain have been processed, at step 918 the process deletes the transaction page chain for the transaction in process.

When the process finds the COMMIT state change entry for transaction ID 2 in the audit trail 1150, companion page 10 is moved from the transaction page chain for transaction ID 2 onto the companion page chain for page 10. In further processing the transaction page chain for transaction ID 2, the process finds the database page entry for page 8, writes page 8 to the database file, and searches the companion page chain for entries for page 8. In the companion page chain, the process finds the entry for companion page 8 made by transaction 1, and removes the page from the companion page chain.

Once the recovery process reaches the end of the audit trail (decision step 902), there may still be entries in the companion page chain which have not been removed due to a subsequent database page entry. Continuing with the example based on the audit trail 1150 of FIG. 11E, suppose that the COMMIT entry for transaction ID 2 is the last entry on the audit trail. The companion page chain still contains companion page 10 for transaction ID 2, and decision step 920 finds that the companion page chain is not empty and continues the process at step 922. Since the audit trail contains no record of the database page 10 having been written after the COMMIT of transaction ID 2, the transaction ID 2 update to page 10 may be recovered using the companion page in the companion page chain for page 10. At step 922, the process reads database page 10 from the database file. For each companion page entry for page 10 in the companion page chain, at step 924 the process calls on the DBMS to apply the respective modifications as specified in the companion pages. Note also that a companion page may describe multiple modifications which were made by a single transaction, and those multiple modifications are made at step 924. After all the modifications specified in the companion pages for page 10 have been applied, at step 926 the process writes the updated page 10 to the database file. Steps 922-926 are then repeated for each other remaining set of companion page entries in the companion page chain. The companion page chain may be deleted once all entries have been processed.

At step 928 the DBMS may be restarted with the recovered database. Several activities may be included in the restart including initiating a new audit trail, re-initializing various data structures, logging the database start time, and so on. Once the DBMS is restarted, it can again process transactions.

While not shown, it will be recognized that the recovery process also handles any transactions that were executing (sometimes called "in-flight") at the time the DBMS stopped (e.g., due to a DBMS crash or due to a system crash or due to some other cause). Depending on the processing state, the recovery process may rollback the transaction updates or roll them forward, depending on implementation requirements.

For some kinds of database tables, for example a table which keeps the running balance for bank branches, writing a copy of the database page to the audit trail and to the database file happens infrequently. There may be, perhaps, hundreds of branch records on each database page. This may cause the database recovery time to be excessive since the recovery is essentially at the record level. In order to reduce the recovery time, periodic static backups of the database files may be made (forcibly quiescing the system), or periodically a transaction may be forced to acquire an XUP on a page on which the number of UP locks granted to the page before the database page is written to the audit trail and to the file exceeds some threshold, for example two times the number of records on the page.

The approach used in the embodiments of the present invention combines the forced XUP locking approach along with the page split mechanism. This accomplishes two things: 1) it forces a write of the database page to the audit trail; and 2) it reduces the number of records on the page to reduce the number of future lock requests for the page. By repeatedly applying the XUP lock and page split technique, eventually each page contains only one record, increasing the probability that only one transaction will acquire an UP lock and will write the database page at COMMIT time. Once the page contains only one record, the DBMS reverts back to the periodic forced XUP lock on the page to guarantee that the database page is periodically written to the audit trail.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of software systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for processing database transactions against a database having a plurality of records stored on a plurality of database pages, comprising:
   receiving a first transaction that specifies an operation for changing state for a first of the plurality of records stored on a first of the plurality of database pages, wherein the operation is one of an insert, update, or delete operations;
   changing the state of the first record according to the first transaction;
   storing in a companion page, a transaction identifier of the first transaction, data describing the specified operation, a page identifier of the first page, a before look and an after look of the first record for an update operation, and an after look of the first record for an insert operation;
   in response to a commit of the first transaction:
   determining whether a second transaction, that specifies a change in state for a second of the plurality of records and the second record being stored on the first page, is in-process;
   storing, in response to determining that the second transaction is in process, the companion page in an audit trail;
   storing in the audit trail, in response to determining that the second transaction is not in process, a transaction identifier of the first transaction, a page identifier of the first page and a before look and an after look of the first record; and
   in response to a request to recover the database, performing the steps including:
   for each database page in the audit trail for a committed transaction, storing the database page in a database file in persistent storage;
   for each companion page in the audit trail that specifies a change to a database page prior to an entry being stored in the audit trail for the database page, bypassing updating the database according to the operation specified in the companion page; and
   for each companion page in the audit trail for a committed transaction and for which an entry in the audit trail was not made for a corresponding database page, applying the operation specified in the companion page to the database page and storing the database page in persistent storage.

2. The method of claim 1, further comprising:
   obtaining a first lock on the first record by the first transaction before the step of changing the state, wherein the first lock prohibits another transaction from changing the first record and thereby inhibiting the scanning of all records of the first page and the operation by another transaction on any record on the first page other than the first record; and
   releasing the lock on the first record after the step of storing in the audit trail.

3. The method of claim 1, further comprising in response to a request to rollback the first transaction and the first transaction specifying an update operation, performing the steps including:
   copying the before look of the first record from the companion page to the first page.

4. The method of claim 3, further comprising:
   obtaining a first lock on the first record by the first transaction before the step of changing the state, wherein the first lock prohibits another transaction from changing the first record and thereby inhibiting the scanning of all records of the first page and the operation by another transaction on any record on the first page other than the first record;
   releasing the lock on the first record after the step of storing in the audit trail;
   obtaining a second lock on the first record for the rollback request before the step of copying, wherein the second lock causing another transaction to access a record other than the first record on the first page and prohibits splitting and merging of the first page while the second lock is held; and
   releasing the second lock after the step of copying.

5. The method of claim 4, further comprising:
   in response to detecting an error condition in processing a third transaction, storing a record in the audit trail that specifies that the third transaction was rolled back; and
   in response to a request to recover the database and in response to detecting a rollback record in the audit trail for a third transaction, bypassing updating the database according to any audit trail record for the third transaction.

6. The method of claim 1, further comprising in response to the first transaction specifying a delete operation, storing in the companion page a record number of the first record and for each key column of the database a key column identifier, a data type, a sort order, and a key column value.

7. The method of claim 1, further comprising in response to a commit of the first transaction, storing in the audit trail a commit record including the transaction identifier of the first transaction and data that indicate the transaction has been committed.

8. The method of claim 1, further comprising:
obtaining a first lock on the first record by the first transaction before the step of changing the state, wherein the first lock prohibits another transaction from changing the first record and thereby inhibiting the scanning of all records of the first page and the operation by another transaction on any record on the first page other than the first record;
releasing the lock on the first record after the step of storing in the audit trail; and
in response to a request to rollback the first transaction and the first transaction specifying an update operation, copying the before look of the first record from the companion page to the first page.

9. A data processing system, for processing database transactions, comprising:
a storage arrangement for storing a database and an audit trail;
a processor coupled to the storage arrangement, wherein the storage arrangement is configured with instructions for causing the processor to perform the operations including, processing a transaction that specifies an operation for changing state of a record stored to a page of the database, wherein the operation is one of an insert, update, and delete operation, and the record is one of a plurality of records stored on one of a plurality of database pages, wherein the transaction has a first level of control over access to the record and a second level of control over access to the database page, and committing the transaction, the committing including the operations of:
storing contents of the database page in a record in an audit trail in response to no other transaction having any level of control over access to the database page,
storing a before look of the record and an after look of the record for an update database operation in a record in the audit trail in response to another transaction having a level of control over access to the database page, and
storing a commit record for the transaction in an audit record in the audit trail; and
in response to a request to recover the database, performing the steps of:
for each database page in the audit trail for a committed transaction, storing the database page in a database file in persistent storage,
for each companion page in the audit trail that specifies a change to a database page prior to an entry being stored in the audit trail for the database page, bypassing updating the database according to the operation specified in the companion page, and
for each companion page in the audit trail for a committed transaction and for which an entry in the audit trail was not made for a corresponding database page, applying the operation specified in the companion page to the database page and storing the database page in persistent storage.

10. The system of claim 9, the operations further including:
obtaining a first lock on the first record by the first transaction before the step of changing the state, wherein the first lock prohibits another transaction from changing the first record and thereby inhibiting the scanning of all records of the first page and the operation by another transaction on any record on the first page other than the first record, and
releasing the lock on the first record after the step of storing in the audit trail.

11. The system of claim 9, the operations further including, in response to a request to rollback the first transaction and the first transaction specifying an update operation, copying the before look of the first record from the companion page to the first page.

12. The system of claim 11, the operations further including:
obtaining a first lock on the first record by the first transaction before the step of changing the state, wherein the first lock prohibits another transaction from changing the first record and thereby inhibiting the scanning of all records of the first page and the operation by another transaction on any record on the first page other than the first record,
releasing the lock on the first record after the step of storing in the audit trail,
obtaining a second lock on the first record for the rollback request before the step of copying, wherein the second lock causing another transaction to access a record other than the first record on the first page and prohibits splitting and merging of the first page while the second lock is held, and
releasing the second lock after the step of copying.

13. The system of claim 12, the operations further including:
in response to detecting an error condition in processing a third transaction, storing a record in the audit trail that specifies that the third transaction was rolled back, and
in response to a request to recover the database and in response to detecting a rollback record in the audit trail for a third transaction, bypassing updating the database according to any audit trail record for the third transaction.

14. The system of claim 9, the operations further including, in response to the first transaction specifying a delete operation, storing in the companion page a record number of the first record and for each key column of the database a key column identifier, a data type, a sort order, and a key column value.

15. The system of claim 9, the operations further including, in response to a commit of the first transaction, storing in the audit trail a commit record including the transaction identifier of the first transaction and data that indicate the transaction has been committed.

* * * * *